United States Patent
Long et al.

(10) Patent No.: US 11,034,904 B2
(45) Date of Patent: Jun. 15, 2021

(54) CLOSE PACKING BRIQUET SHAPES

(71) Applicant: The Clorox Company, Oakland, CA (US)

(72) Inventors: Joshua Long, Pleasanton, CA (US); Stephen Fisher, Pleasanton, CA (US); Donald Swatling, Pleasanton, CA (US); Stefan Brown, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 194 days.

(21) Appl. No.: 16/149,337

(22) Filed: Oct. 2, 2018

(65) Prior Publication Data

US 2019/0100709 A1    Apr. 4, 2019

Related U.S. Application Data

(60) Provisional application No. 62/568,274, filed on Oct. 4, 2017.

(51) Int. Cl.
*C10L 5/36* (2006.01)
*A47J 37/07* (2006.01)
*C10L 5/00* (2006.01)

(52) U.S. Cl.
CPC ............. *C10L 5/361* (2013.01); *A47J 37/079* (2013.01); *A47J 37/0768* (2013.01); *C10L 5/00* (2013.01); *C10L 5/36* (2013.01)

(58) Field of Classification Search
CPC . C10L 5/361; C10L 5/00; A47J 37/079; A47J 37/0768
See application file for complete search history.

(56) References Cited

U.S. PATENT DOCUMENTS

| | | | | |
|---|---|---|---|---|
| 2,876,084 A | * | 3/1959 | Leggin | C10L 5/44 44/558 |
| 3,527,580 A | * | 9/1970 | Bonlie | B30B 15/0005 44/543 |
| 4,496,366 A | * | 1/1985 | Peters | C10L 5/36 44/530 |
| 5,049,333 A | * | 9/1991 | Wolfe | B30B 11/16 264/109 |
| 5,762,656 A | * | 6/1998 | Burke | C10L 5/04 44/589 |
| D517,473 S | * | 3/2006 | Jackson | D13/100 |
| D560,603 S | * | 1/2008 | Saunders | D13/100 |
| D638,786 S | * | 5/2011 | Swatling | D13/100 |
| D649,510 S | * | 11/2011 | Christensen | D13/100 |
| 2005/0178052 A1 | * | 8/2005 | Saunders | C10L 5/361 44/550 |

(Continued)

*Primary Examiner* — Travis M Figg
(74) *Attorney, Agent, or Firm* — Thomas C. Feix

(57) ABSTRACT

Briquet designs that facilitate close packing and improve burn efficiency are provided herein. Such designs can include scaled down briquet size and close packing shapes, which can include pyramidal shaped portions, such as rectangular pyramids and tetrahedron shapes, as well as oblate spheroid and hexoid shapes, to facilitate closer random packing when the briquets are randomly arranged in a pile when poured from a bag. Some briquet shapes can further include special surface features, such as flattened or rounded portions or depressions, such as dimples, that reduce volume without increasing the bulk density in order to further improve burn performance and efficiency.

21 Claims, 22 Drawing Sheets

(56) References Cited

U.S. PATENT DOCUMENTS

| | | | |
|---|---|---|---|
| 2011/0067296 A1* | 3/2011 | Melin | C10L 5/447 |
| | | | 44/532 |
| 2011/0219678 A1* | 9/2011 | McHale | C10L 5/361 |
| | | | 44/550 |
| 2015/0075064 A1* | 3/2015 | Melin | C10L 11/06 |
| | | | 44/532 |
| 2016/0010014 A1* | 1/2016 | Shetty | C10L 9/10 |
| | | | 44/545 |
| 2016/0051090 A1* | 2/2016 | Uriarte | A47J 37/079 |
| | | | 126/25 B |

* cited by examiner

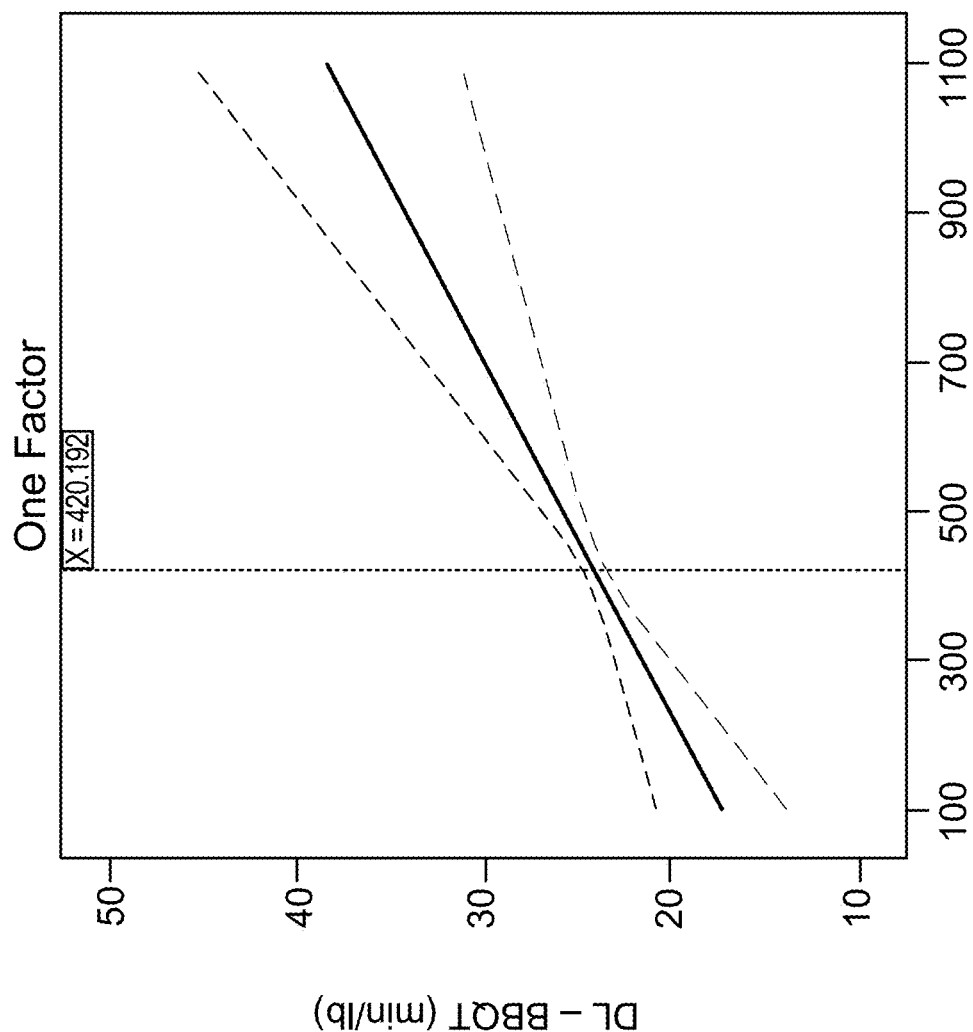

CLOSE PACKING BRIQUET SHAPES

This application is a Non-Provisional of and claims the benefit of priority of U.S. Provisional Application No. 62/568,274 filed Oct. 4, 2017, the entire contents of which are incorporated herein by reference.

BACKGROUND OF THE INVENTION

This application generally relates to solid fuel briquets used for heating or cooking. In particular, the invention pertains to briquet shapes that provide improved ignition and burn characteristics.

There is considerable consumer interest in using charcoal briquets for outdoor cooking in which meals can be prepared and served quickly for individuals or large groups. Consumers desire cooking and grilling with charcoal briquets that are readily stackable to form the traditional starter pile, easily ignitable, maintain a uniform and efficient combustion that ignites the individual briquets in the starter pile, and have a sufficiently long burn period. Similarly, consumers prefer to minimize handling of dirty charcoal when forming traditional starter piles and the like.

Conventional charcoal briquets are often configured in a generally pillow-shape. This configuration provides for both reasonable ease of manufacturing by the supplier, and handling by the consumer. Pillow-shaped briquets are typically used for cooking on the grill or the like by using briquets stacked within a mounded or conical configuration or pile usually by pouring the briquets from a bag onto a grill substrate or the like. Then lighter fluid is often added, and followed by igniting the briquets with an ignition source.

An "ignition phase" follows, as burning proceeds from the surface of the briquet, and a gray ash is formed on a significant portion of the briquet until a majority of the exposed surfaces have ignited, and burning has progressed inwardly toward the intended area of the briquets. Thus, completion of the ignition phase of burning is identified by the formation of visible ash on the briquet.

At this point, the briquets are spread out under the grill or the like, and they continue to burn with intense heat suitable for cooking and grilling throughout a "burn phase". For maximum performance of the briquets, it is desirable that the ignition phase be limited in time so that the briquets may be used for cooking or grilling fairly quickly, so that the duration of the burn phase is optimized and extended to a suitable cooking or grilling time.

There has been some previous work in the ornamental and geometrical configuration of charcoal briquets. For example, U.S. Des. 389,453 to Mitchell et al. describes a charcoal briquet having a groove generally in the shape of the letter "K", and U.S. Pat. No. 4,496,366 to Peters describes charcoal having a briquet, or other geometric configuration, purportedly to achieve desired lighting and burn characteristics. In another example, U.S. Pat. No. 6,074,446 to Fujino describes charcoal having a plurality of air passing portions or grooves in its body purportedly to supply combustion air inside the charcoal body while burning.

However, previously known ornamental and geometrically configured charcoal briquets fail to address ignition and burn phase characteristics of the briquets associated with randomly arranging the briquets in a pile when poured from a bag. Previously known charcoal briquets intended for rapid ignition and delivery of intense heat have used combinations of various configurations and compositions, typically examining the burn characteristics of briquets individually. However, very rapid delivery of intense heat often does not provide an acceptable combustion response for cooking or grilling purposes. Previous teachings have failed to address or resolve the effect of briquet shapes on the arrangement of briquets within a pile when randomly poured from a bag of briquets. Therefore, there exists a need for briquet designs and shapes that improves random arrangement of the briquets to enhance ignition and burn characteristics, thereby improving performance and efficiency.

BRIEF SUMMARY OF THE INVENTION

The present invention relates to briquet designs and shapes that facilitate random close packing and/or improved burn performance as compared to conventional briquets, in particular pressed briquets for grilling.

In one aspect, a briquet formed of a solid combustible fuel in a defined shape is provided. In some embodiments, the shape is defined to allow a briquet packing density of 450 to 3,000 briquets per cubic foot when a plurality of briquets of like shape are randomly arranged within a randomly poured pile. In some embodiments, the shape is defined so that a volume of each briquet is within a range between 0.2 to 2 cubic inches, or, in some embodiments, 0.25 to 1.8 cubic inches. In some embodiments, the shape is defined so a total number of edges within the randomly poured pile is within a range from 5,000 to 15,000 inches per cubic foot. In some embodiments, the shape can include one or more surface features comprising 35% or less of the total surface area of the briquet. Such surface features can include a dimple, depression or other indentation.

In another aspect, briquets defined as close packing shapes are provided. Such briquets can include a solid combustible fuel formed in shape that includes one or more polygonal pyramidal portions dimensioned to facilitate close packing when a plurality of briquets of like shape are randomly arranged. In some embodiments, the shape is of a volume within a range from 0.25 to 1.8 cubic inches, 0.5-1.8 cubic inches, 0.8-1.8 cubic inches, 1.0-1.8 cubic inches, or 1.3-1.8 cubic inches. In some embodiments, the shape is of a volume within a range from 0.25 to 1.5 cubic inches, 0.5 to 1.5 cubic inches, 0.8 to 1.5 cubic inches, or 1.0 to 1.5 cubic inches. In some embodiments, close packing refers to a packing density within a range of about 450 to 3,000 briquets per cubic foot when randomly arranged within a poured pile. In some embodiments, the briquets are shaped so as to facilitate close packing of 500-3,000; 600-3,000; 700-3,000; 800-3,000; 900-3,000; 1,000-3,000; 1,500-3,000; 2,000-3,000; or 2,500-3,000 briquets per cubic foot. Some embodiments are shaped to facilitate close packing within a range of 450-2,500; 450-1,500; 500-2,000; 600-1,500; 700-1,000; or 700-900 briquets per cubic foot.

In some embodiments, a briquet having a close packing shape is formed such that the base of each of a pair of pyramidal portions extends from a mid-plane portion of the briquet such that the briquet is symmetrical about the mid-plane. In some embodiments, the mid-plane portion is a square with rounded corners. The square of the mid-plane can include inwardly rounded sides and each of the pyramidal portions can include a surface feature along an apex of the respective pyramidal portion. The surface feature can include a circular dimple, hole or other indentation. In some embodiments, the pyramidal portions can include smoother or rounded edges such that the top and bottom surface of the briquet are a substantially continuous surface.

In some embodiments, the pyramidal portions extend from the base that is perpendicular to the mid-plane, the pyramidal portion being defined by can be defined by opposing triangular portions of top and bottom halves of the briquet. In such embodiments, the height of the pyramidal portion extends along the horizontal mid-plane of the briquet. In some embodiments, the shape is formed such that the apex of the opposing portions is off-center. Such a configuration facilitates manufacture by providing a trailing face that is more shallow than a leading face of the briquet during a press-roll manufacturing process, which aides in release of the briquet from a pocket of the press rollers. While such briquet configurations can be formed by use of press-rolling, it is appreciated that a briquet in accordance with any of the briquet features described herein could be manufactured in a variety of ways, including but not limited to tableting, pelletizing or extrusion operations (e.g. extruded logs or cut extruded briquets). Further, it is appreciated that the advantageous design features are applicable to any shaped piece of charcoal where the improved burn characteristics described herein are desired.

In still other embodiments, the close packing shape can include an oblate spheroid shape or an oblate hexoid shape. Such shapes can further include a surface feature, such as a dimple or other indentation.

These and other objects and advantages are achieved by the present invention which comprises briquet shapes that allow for random close packing, thereby enhancing ignition properties and burn phase characteristics. Such shapes can any of the shapes or designs described herein, and can further include one or more special surface features as described herein to further reduce volume and improve burn efficiency.

These and other objects and advantages of the present invention will become apparent from the following description of the preferred embodiments of the invention, taken together with the accompanying drawings.

BRIEF DESCRIPTION OF THE DRAWINGS

FIGS. 6A and 6B shows one factor plots of volume versus BBQT and briquet packing density versus BBQT, respectively;

DETAILED DESCRIPTION OF THE INVENTION

Figure 1A:
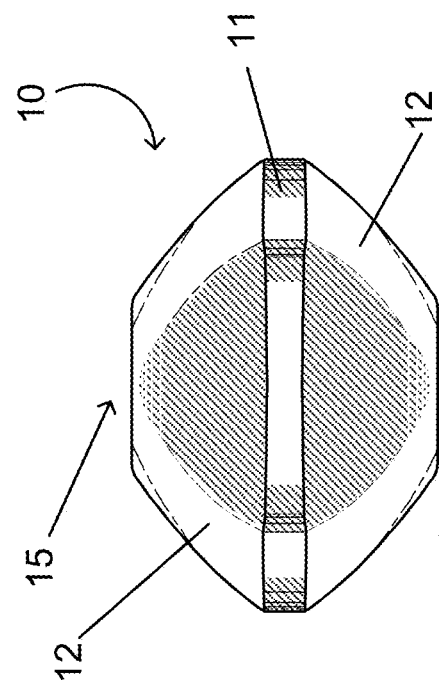
FIGS. 1A-1D illustrates an example briquet shape having improves close packing properties, in accordance with some embodiments of the invention.

In one aspect, the present invention pertains to shapes that improve any of the following attributes: (i) ease of ignition (EOI), a measure of how easily the charcoal ignites (percentage of ash on briquet at 10 minutes); (ii) time to cooking readiness (TTCR), a measure of how quickly the charcoal gets to 70% ash (time-based measurement); (iii) time to 380° F. (TT380), a measure of how quickly the charcoal gets to 380 F (time-based measurement); (iv) time over 380 F (TO380), a measure of how long the charcoal burns over 380° F. (time based measurement); (v) peak charcoal temperature (PCT), a measure of the peak temperature that the charcoal hits during the course of the burn (temperature measurement); and (vi) BBQT/LB—the TO380 of the burn divided by the lbs. of charcoal used for the burn (this new metric was developed to quantify efficiency of burn as it relates to TO380).

Various features of a charcoal briquet that drive each attribute were identified and models were created for each attribute. These models allowed for determination of shapes of the briquet that deliver substantial improvements in burn performance. These models were ultimately used to develop various close packing briquet shapes, including those described herein. These shapes deliver improved lighting performance (EOI/TTCR/TT380) without sacrificing TO380 and while using less overall product as compared to conventional designs. While shape depicted in FIG. 1 is particularly advantageous from both a performance, manufacturing and aesthetic standpoint, there are various other shapes that can also deliver similar performance benefits, such as any of those described herein. For example, as long as the shapes meet the constraints in FIG. 4, such shapes can provide improved performance as compared to conventional briquet designs.

In regard to the improved performance of close packing shapes, it is theorized that the bulk density formed by these shapes, particularly when randomly poured from a bag, improves burn performance for various reasons. Typically, close packing allows for more burnable material in a fixed volume, thereby raising the peak temperature and therefore extending TO380. Also, the closer surface areas of briquet may better transfer heat from one briquet to the other which means less heat is lost or cooled to the ambient air thereby extending burn temperatures. In addition, tighter formation may restrict air flow or be close to stoichiometric conditions. It is appreciated that the advantages of the close packing shapes described herein are not limited by any of the above noted theories and that the surprising advantages and improved performance of the disclosed shapes and designs have been shown by performance testing, as detailed herein.

Table 1, shown below, outlines the attributes that drive briquet performance, as well as the associated benefits for each attribute. Additionally, this table contains a range for each attribute where performance is improved as compared to conventional briquets. It is appreciated that various attributes are dependent on certain other attributes such that selection of one attribute will affect selection of another attribute. For instance, setting the briquet volume will dictate the necessary range for bulk density. The terms "Lower" "Higher" indicates which direction the attribute should trend for the intended benefit.

The above design experiment models above illustrate several relationships. In one aspect, lower briquet volume generally leads to higher EOI, but higher bulk density and airflow pressure drop generally leads to lower EOI. Typically, lower volume leads to a higher bulk density and airflow pressure drop. Therefore, in order to optimize EOI,

TABLE 1

Attributes of Shapes Facilitating Improved Performance by Close Packing

| Attribute | Range | Units | Lights Faster (EO/TTCR) | Ready Faster (TTCR/ TT380) | Burns More Efficiently (BBQT) | Peak Temp | Smaller Package | Less Brokens | Faster Solvent Absorption |
|---|---|---|---|---|---|---|---|---|---|
| Smaller Briquet Volume | 0.25-1.8 | in³ | Lower | | Lower | Lower | Lower | Lower | Lower |
| Airflow | | | Higher | | TBD | Higher | | | |
| Bulk Density | | | Lower | Lower | Lower | | Higher | Higher | |
| Briquets/ft³ | 450-2978 | # of briquets | Higher | | Higher | Higher | Higher | Higher | |
| Total Pile Edges | 9320-11256" | In | Higher | Higher | | | | | |
| Aspect Ratio | | | | | | | | | |
| Surface Feature to Total Surface Area | 0-.32 | % | Higher | | Higher | | | Less | Higher |

In developing improved briquet shapes that allow for close packing between briquets, a number of factors were examined, individually and in combination. These factors included: briquet volume, Briquet Functional Surface Area/Total Surface Area, Functional Surface Area (e.g. area of a special feature), Briquet Edge Length/Total Surface Area, Aspect Ratio, Pressure Drop of Air Across a Briquet Pile, Bulk Density, Briquets/ft³. It is appreciated that some of the factors can correlate with certain other factors, for example, smaller briquets correspond with smaller volumes, which corresponds to increased briquets/ft³.

Various shapes were devices to facilitate close packing of adjacent briquets when randomly poured from a bag, while controlling for one or more of the above factors. Examples of these shapes are provided herein. It is appreciated that various modifications of these shapes can be made while still retaining the advantages of the concepts described herein. The shapes described herein were laboratory tested for EOI, TTCR, TO380, PCT, BBQT/lb and were tested under typical outdoor conditions for TO380, PCT, and BBQT/lb. Experimental models of test responses are presented below in Table 2. The differing briquets that were tested were utilized the same charcoal formulation and tested under tightly controlled conditions in the laboratory testing so that differences in burn characteristics were clearly attributable to the given shape. The tested briquets included a control of a conventionally shaped briquet formed of the same charcoal formulation.

the volume of the briquet should be minimized without increasing the bulk density or pressure drop within the pile. Thus, in addition to defining the briquet in a shape that facilitates close packing, burn characteristics can be further improved by including a special surface feature that reduces the volume of the briquet without increasing bulk density. In some embodiments, this special feature comprises a depression or recessed portion (e.g. dimple, hole, indent, etc.). Preferably, in embodiments having pyramidal shaped portions, the special feature can be a depression or dimple formed along where an apex of the pyramidal portion would be. It is understood that the dimple could be circular or formed in various shapes and depths. Utilizing a special surface feature along this location retains the close packing benefits of the steeper faces of the pyramidal shaped portion, while reducing the volume of the briquet without substantially increasing bulk density or pressure drop within a pile of randomly poured briquets. Such configurations substantially improve burn characteristics as compared to conventional shaped briquets, such as a pillow-shape having substantially shallow, curved faces along top and bottom portions.

In another aspect, lower volume briquets typically leads to a higher BBQT or TO380/lb, which means the product burns more efficiently. Thus, utilizing smaller volume briquets can lead to more efficient burns. It should be noted that as the volume of the briquets becomes too small, inefficiencies in manufacturing can arise and, at some point, the air

TABLE 2

Identified design experiment models of test responses from division laboratory (DL) and outdoor burns (OD)

| DL – EOI = | DL – TO380 = | DL – BBQT = | OD = TO380 = | OD – BBQT = |
|---|---|---|---|---|
| 23.11 | 35.22 | 18.88 | 24.84 | 7.07 |
| −27.96 * D | −18.87 * D | −9.87 * D | −13.06 * D | −3.95 * D |
| −7.81 * H | 4.56 * J | | 3.71 * G | 0.82 * G |
| −7.48 * J | | | 4.80 * J | |

D Volume
G Aspect Ratio
H Air Flow (in H20)
J Bulk Density (lbs/ft^3)

flow through can be adversely impacted adversely affecting burn performance. Therefore, it is beneficial to balance this attribute with the benefits of various other attributes, including ease of manufacture and handling. In some embodiments, the briquets are substantially smaller (e.g. less than 80%, typically about 60% or less) than a standard sized conventional pillow-shaped briquet (e.g. 2" by 2" square pillow-shaped briquet).

In still another aspect, lower volume briquets, coupled with a higher bulk density, typically leads to a higher TO380. A higher bulk density leads to a higher TO380 because there is more mass in the burn. As noted above, this factor can be balanced with other factors described herein in order to provide an optimally sized and shaped briquet.

In view of the above, lighting attributes (EOI, and subsequently TTCR and TT380) can be maximized by minimizing the volume of the briquet without significantly increasing the bulk density or packing density (which directly relates to pressure drop) of the briquet pile. Therefore, smaller briquets that have special surface features (e.g., dimples) that minimize the bulk density of the pile should provide improved lighting performance over current briquets. Along these lines, various shapes have been developed that provide for closer packing when randomly poured into a pile.

In one aspect, the present invention pertains to shapes that allow for random close packing of briquets within a pile when poured by a consumer from a bag. In contrast to approaches that require specifically arranging briquets, this approach pertains to the random arrangement of briquets that occur when merely poured from a bag into a pile. Providing close packing of adjacent briquets within such a randomly arranged pile substantially improves burn efficiency. In some embodiments, such close packing shapes include a polygonal pyramid and shapes having polygonal pyramid portions. Typically, such polygonal pyramidal portions are square pyramid or tetrahedrons, although it is appreciated that in some embodiments, the polygonal base of the pyramid could include five or more sides. In some embodiments, the faces of the pyramidal portions are steeper than the faces of conventional shaped briquets, such as standard pillow-shaped briquets. In a conventional pillow shape, the top and bottom surfaces are generally curved and have an aspect ratio of about 2:1 or greater, the briquet being substantially convexly curved along the entire top and bottom surfaces and having substantially straight sides along the horizontal mid-plane. In contrast, in various close packing shapes, the steepest portion of the inclined top and bottom faces have an aspect ratio of about 1:1. In some embodiments, the close packing shapes include inwardly curved, or concave portions along the edges of the horizontal mid-plane. The inward curve along each edge can extend partly along the top and bottom faces extending from the horizontal mid-plane edges. In some embodiments, the close packing shape can further include a special feature to further improve burn characteristics. The special feature can include any feature that reduces volume and increases surface area. In some embodiments, the special feature includes a depressed or recessed portion, such as a dimple, along where an apex of the pyramidal portion would be.

Figure 1B:
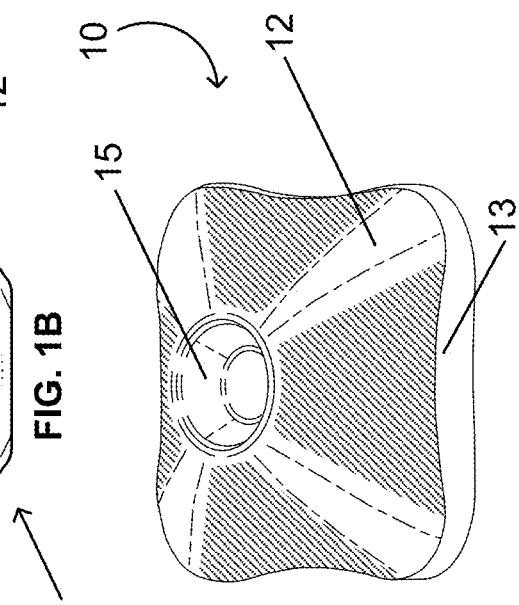
Figure 1C:
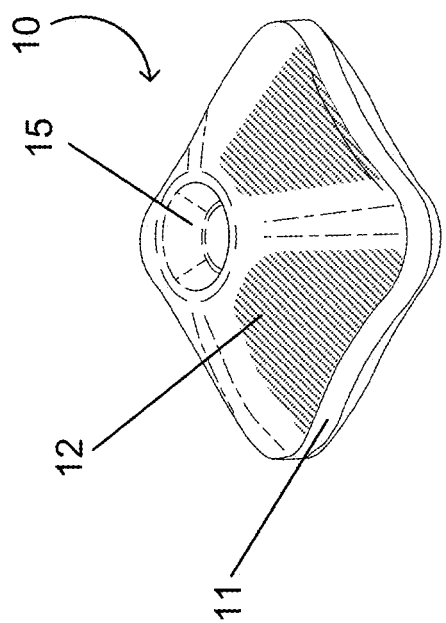
Figure 1D:
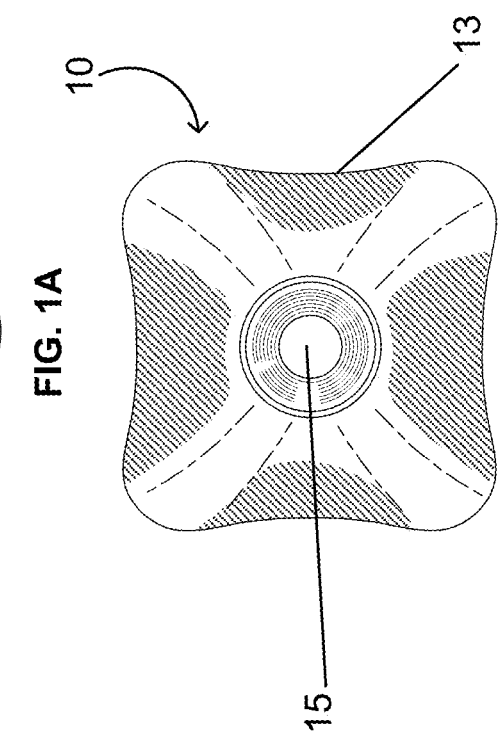

FIGS. 1A-1D depicts an example briquet shape 10 having square pyramidal portions 12 extending from horizontal mid-plane portion 11. The mid-plane portion is generally rectangular in shape such that each of the opposing pyramidal portions 12 is a rectangular pyramid. In this embodiment, the mid-plane is generally square in shape. The mid-plane includes a flattened ridge 11, which is a feature typical of manufacturing the briquet by press-rollers, the ridge being located along where the press-rolls interface. In this embodiment, the edges of the pyramidal portion are rounded or contoured such that each of the top and bottom surfaces of the briquet form a substantially continuous surface. In this embodiment, the steepest portion of the inclined surface of the pyramidal portion, as seen in FIG. 1B, has an aspect ratio of about 1:1. In this embodiment, the square mid-plane has inwardly curved edges 13 from which the faces of the pyramidal portion extend. As can be seen in FIG. 1D, the faces of the pyramid alternate between being convex (adjacent the rounded corners of the square mid-plane portion) and being concave (along the inwardly curved edges 13 of mid-plane). The faces of the pyramid transition as the faces approach the apex to an outwardly curved plane towards a top of the pyramidal portion. In this embodiment, the briquet further includes a special feature 15 defined as a recessed circular dimple along the apex of the pyramidal portion. In this embodiment, the dimple is formed as a circular recessed portion with rounded, contoured edges to facilitate ease of manufacturing the briquet by press rolling.

Figure 2A:
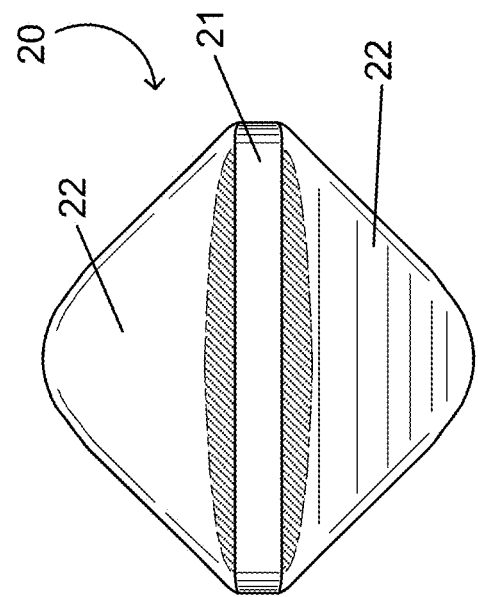
FIGS. 2A-2D illustrates another example briquet shape having improves close packing properties, in accordance with some embodiments.
Figure 2B:
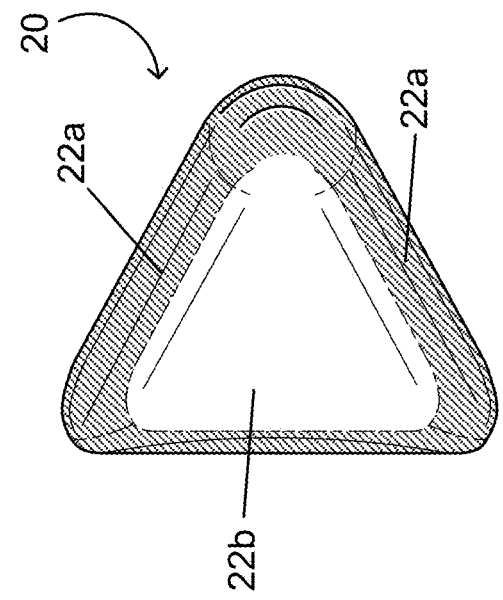
Figure 2C:
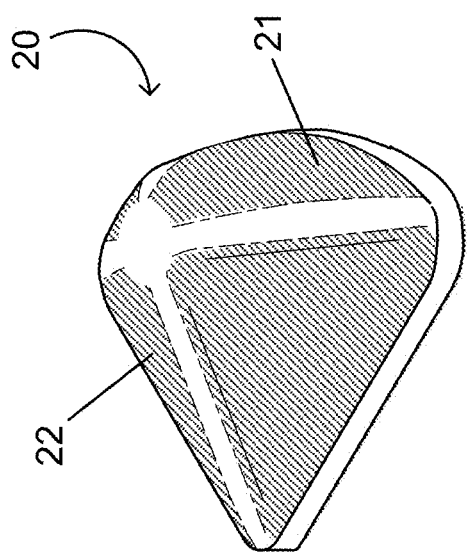
Figure 2D:
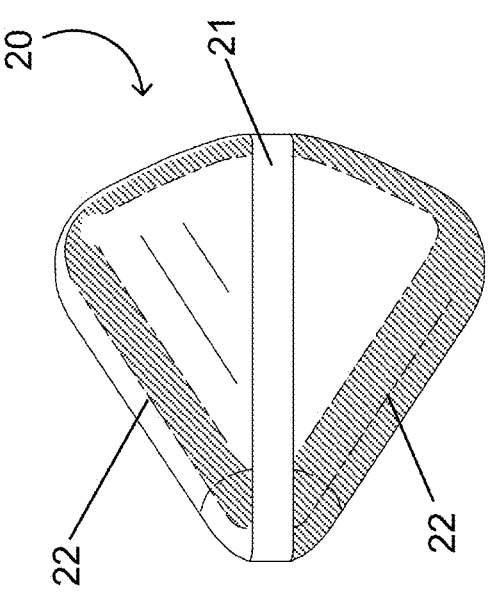

FIGS. 2A-2D depict another example briquet shape 20 having pyramidal portions 22 extending from horizontal mid-plane portion 21. In this embodiment, the mid-plane portion is triangular such that the each pyramidal portion is a triangular pyramid or tetrahedron. Similar to the previous embodiment, the mid-plane portion includes a flattened ridge 21 to facilitate manufacture of the briquet by press-rollers. In this embodiment, the triangular pyramids are defined such that the apex is offset from a center of the triangular mid-plane portion 21. This results in formation of two steeper faces 22a along a leading side during manufacture by press rollers and a larger, more shallow side 22b along a trailing side of the briquet, as seen in FIG. 2D. This configuration facilitates manufacture of the briquet by press-rolling as the larger, more shallow face 22b provides a larger surface against which the press-rollers engage to push the briquet for release from between the pair of rollers. In addition, the larger surface reduces stresses and potential damage to the briquet during release. In this shape, a majority of the briquet defines another pyramidal portion having a height along the mid-plane portion (see FIG. 16). While in this embodiment there is no special surface feature included, it is appreciated that such a feature could be included along various locations to reduce the volume without increasing the bulk density to further improve burn performance.

Figure 3:
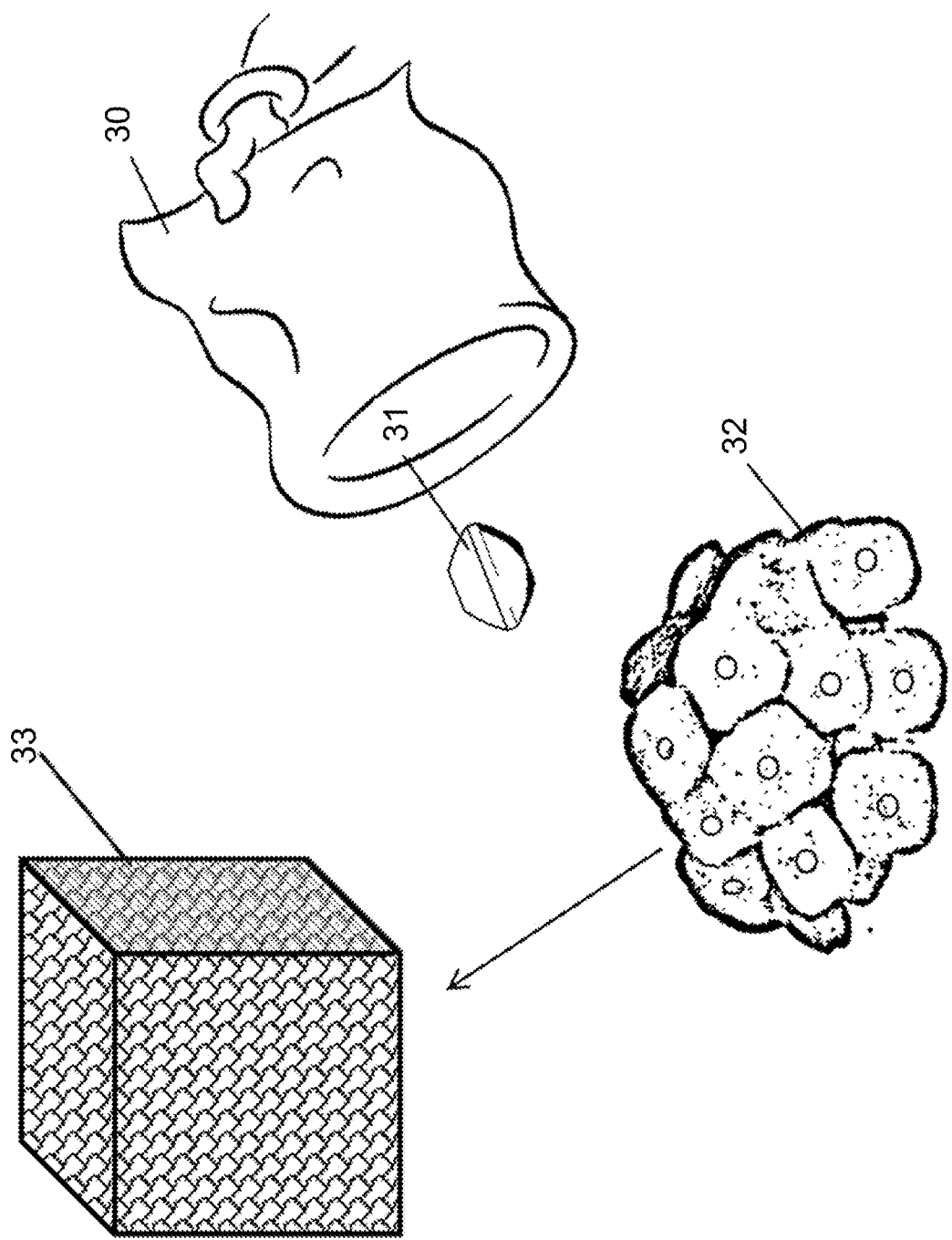
FIG. 3 shows an example close packed briquet density in a random pour stack associated with briquet shapes in accordance with some embodiments.

FIG. 3 illustrates a random close packed pile of briquets formed by pouring multiple briquets from a bag onto a substantially planar surface (e.g. grill grate or substrate). The briquet shapes described herein allows adjacent briquets to more closely pack as compared to conventional briquet designs. In one aspect, pyramidal shapes generally provide closer packing that conventional briquet shapes, such as a pillow shape. While a purely pyramidal shape may be desirable for close packing, such shapes include sharp corners and apex such that manufacturing briquets in such shapes can be challenging and damage to briquets can occur during shipping and handling. Thus, such shapes can be utilized by forming briquets in shapes that generally approach pyramidal shapes or include pyramidal portions.

Ideally, each briquet shape is defined in a close packing shape such that when poured into a randomly arranged pile, as shown in FIG. 3, the pile has a briquet density 33 within a range of 450 to 3,000 briquets/ft$^3$. It is understood that the ideal density of briquets also depends on the volume of each individual briquet. It is appreciated that the briquet packing density within that range depends in part on the volume of individual briquets. In some embodiments, a bag of briquet may include multiple shapes and/or sizes of briquets, for example, multiple sizes of like shapes, multiple shapes, or multiple sizes and shapes. In some embodiments, the sizes and shapes of briquets are selected so as to be complementary to provide a close packing arrangement when randomly poured.

Figure 4A:
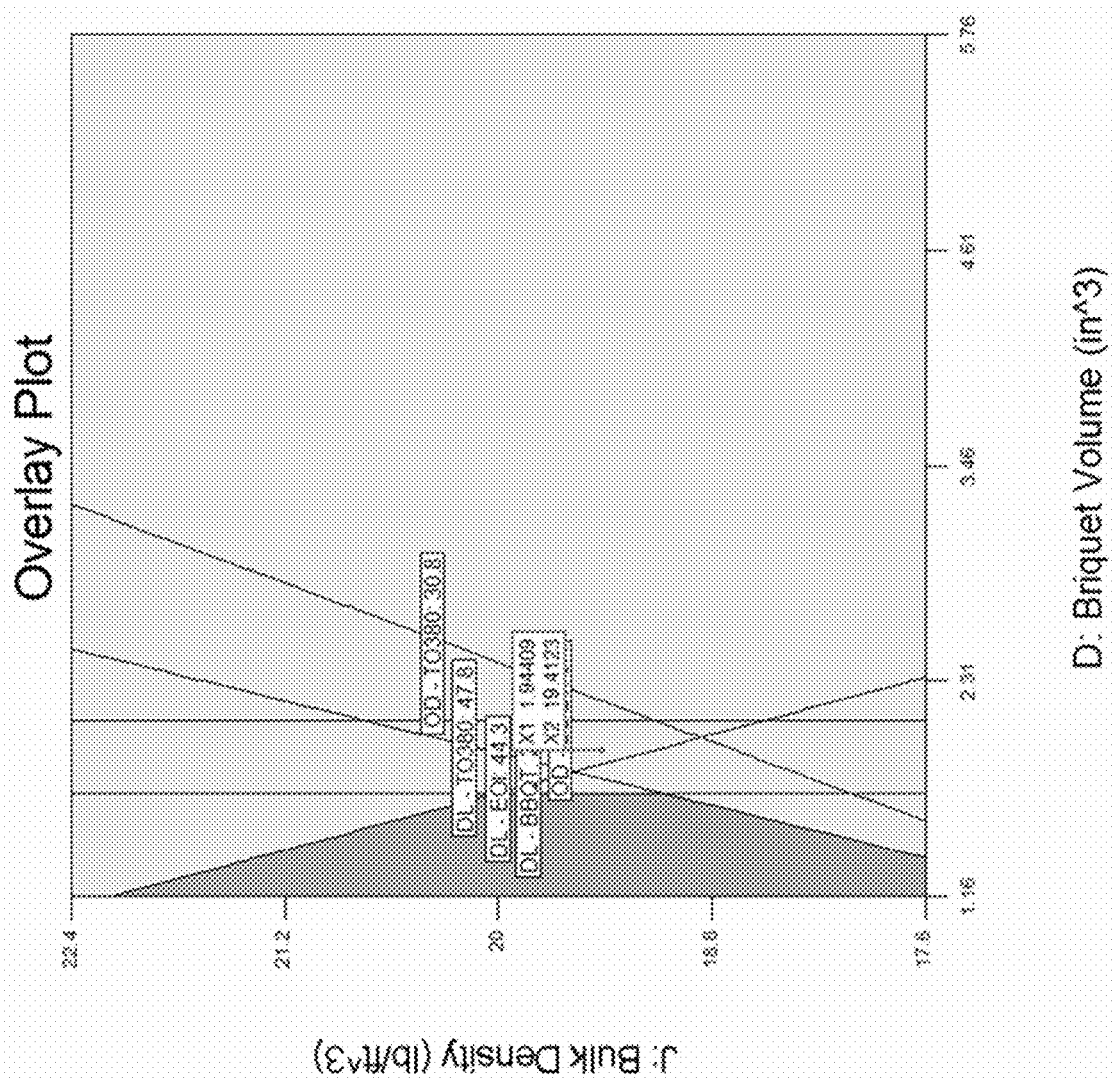
FIGS. 4A and 4B show graphs of briquet attributes that provide improved burn performance over conventional briquet designs.
Figure 4B:
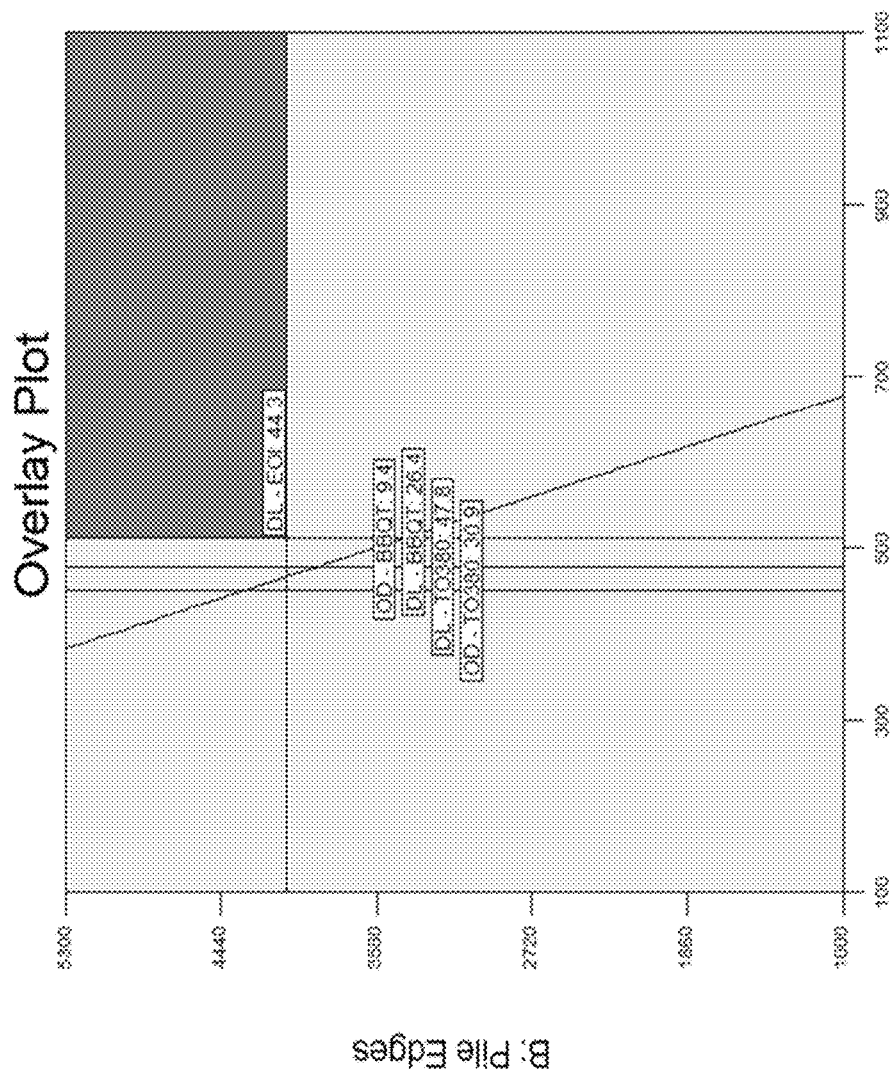

FIGS. 4A and 4B depict graphs that shows combinations of briquet volumes and bulk densities or combination of pile edges and briquet packing density, respectively, that provide improved performance over conventional pillow-type briquet designs, as indicated in the highlighted dark gray area at left. The design of FIG. 1 falls into the identified dark gray ranges in each of FIGS. 4A and 4B and shows improved lighting performance over the conventional design without sacrificing burn time. Table 3 below shows the burn performance of the design of FIG. 1 as compared to the control (conventional pillow-shape design). Table 4 below shows the briquet packing densities provided by the improved briquet designs of FIGS. 1 and 16 as compared to typical conventional pillow-type briquet designs.

TABLE 3

Burn Performance of Improved Design as Compared to Control Design

| Row Labels | Average of VA10 | Average of TO380 |
|---|---|---|
| Control | 47.8 | 42.4 |
| Design of FIG. 1 | 53.0 | 42.8 |
| Grand Total | 50.4 | 42.6 |

*Improved design has 7.5% less mass than control design

TABLE 4

Briquet Packing of Improved Designs as Compared to Conventional Designs

| Product | Avg. Volume (in³) | Briq/ft³ Data | | | | | |
|---|---|---|---|---|---|---|---|
| | | Rep 1 | Rep 2 | Rep 3 | Rep 4 | Rep 5 | Average |
| Conventional Shape 1 | 1.89 | 221 | 217 | 212 | 210 | | 430 |
| Design of FIG. 1 | 1.34 | 351 | 352 | 351 | | | 703 |
| Design of FIG. 16 | 1.07 | 444 | 442 | | | | 886 |
| Conventional Shape 2 | 2.08 | 196 | 192 | 192 | 197 | 201 | 391 |

*Each rep is 0.5 ft^3

Figure 5A:
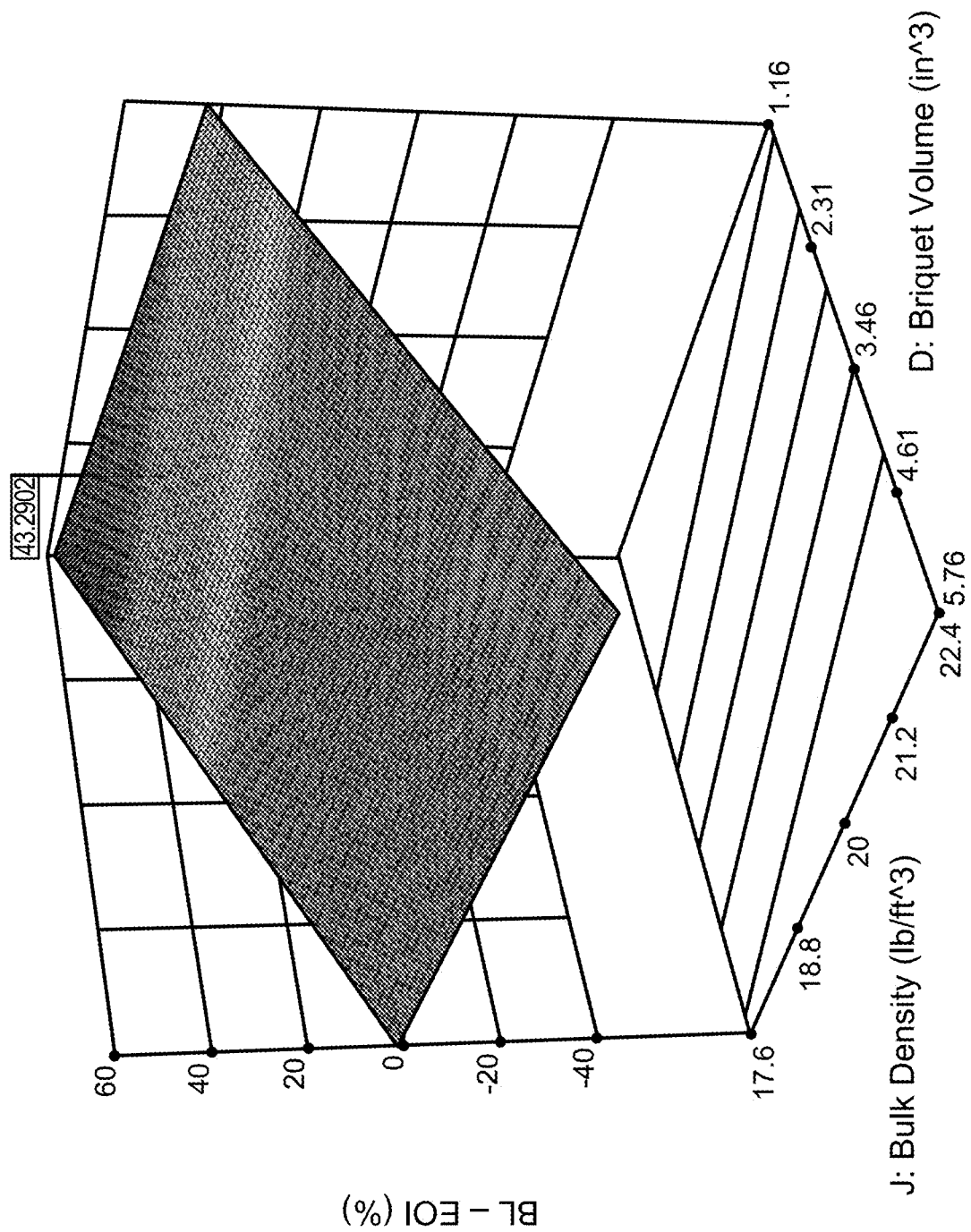
FIGS. 5A and 5B show 3D plots that illustrates the impact on % EOI of briquet volume and bulk density or of pile edges and bulk density, respectively.
Figure 5B:
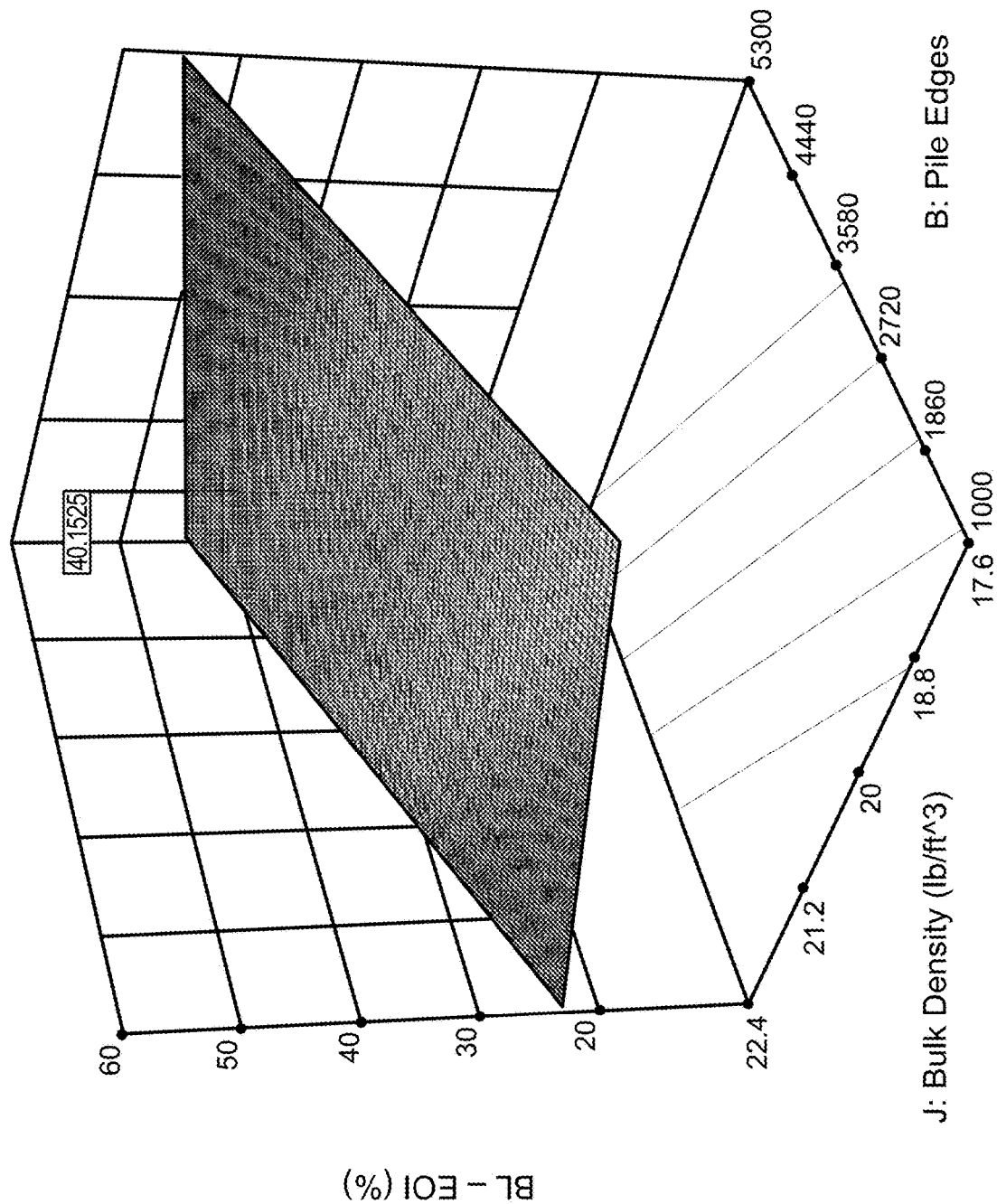

FIG. 5A depicts a graph that shows specifically how % EOI changes with both volume and bulk density. FIG. 5B depicts a graph that shows specifically how % EOI changes with both bulk density and pile edges. The flag on each chart represents the conventional charcoal briquet product. The chart clearly shows that lower volume or pile edges combined with a lower bulk density provide significant advantages over the conventional briquet product.

Figure 6A:
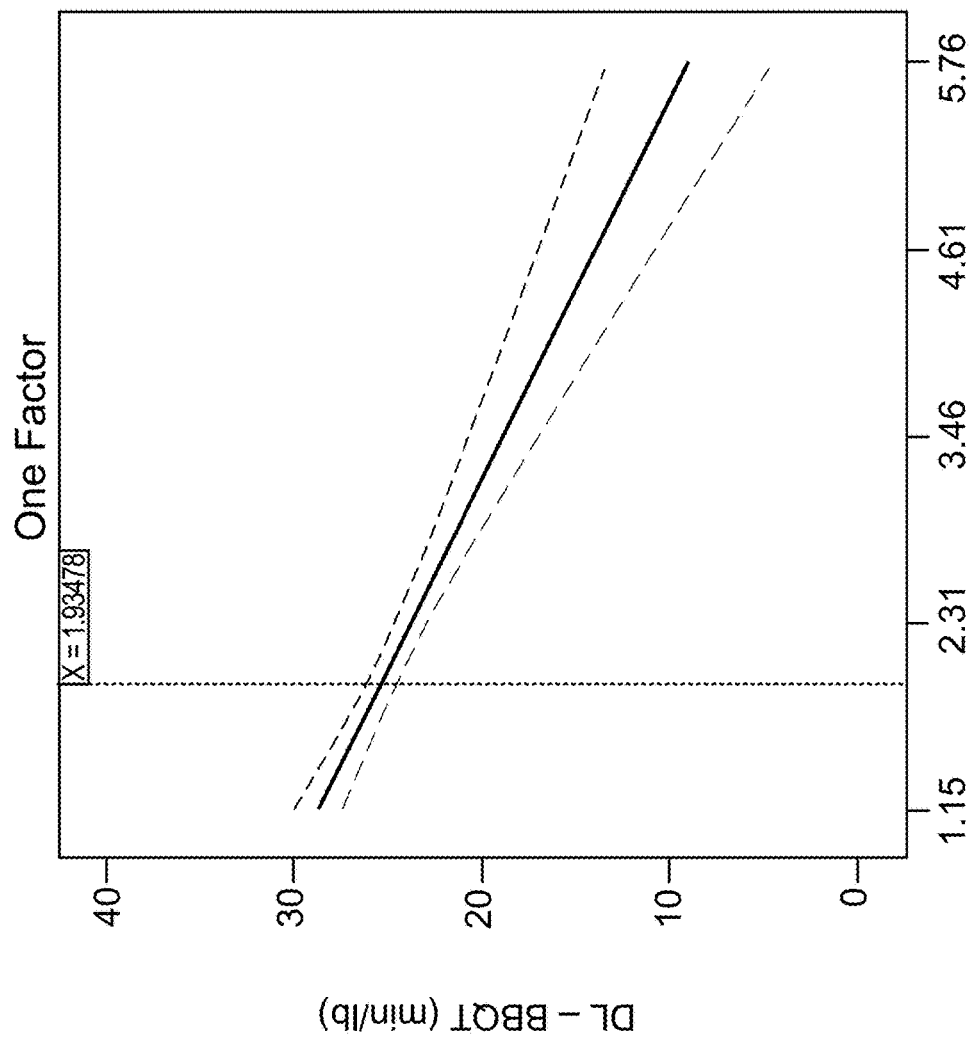

FIG. 6A shows a graph that highlights how BBQT (TO380/min) is impacted by briquet volume, which was the primary significant factor for BBQT. FIG. 6B shows a graph that highlights how BBQT (TO380/min) is impacted by briquet packing density. The blue line in each graph shows the volume of the conventional charcoal briquet product. The graphs indicates that briquet volumes smaller than the typical size of conventional briquets and increased briquet packing density provide more efficient burn. In this case, the less material can be used than in the conventional shape while maintaining the same TO380. Thus, when combining the close packed shapes described herein with smaller volumes can provide even more advantages and improvements in burn efficiency as compared to conventional design.

Figure 7:
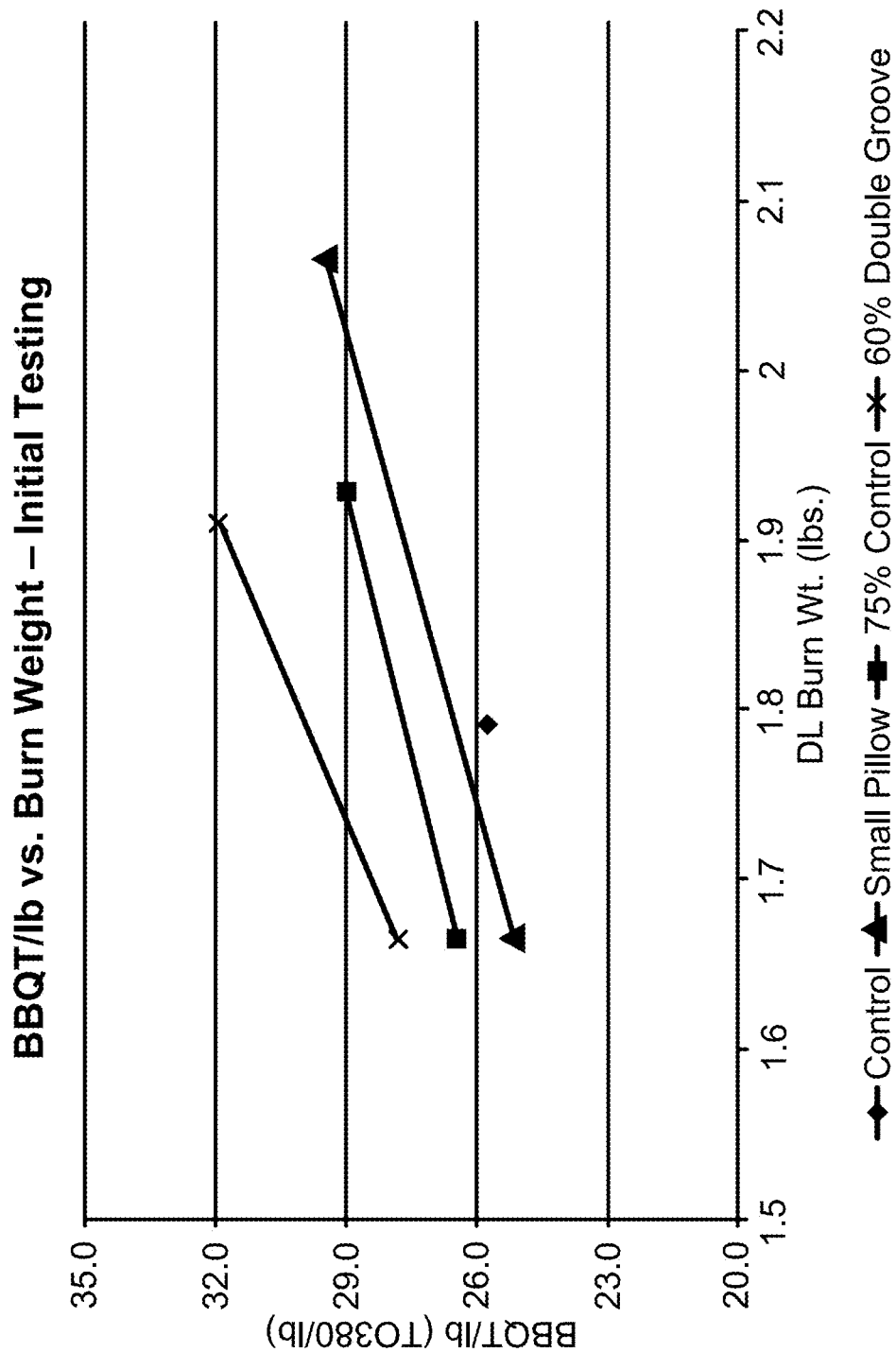
FIG. 7 shows burn efficiency of select briquet designs of some embodiments as compared to conventional briquet designs.

FIG. 7 depicts a graph showing the advantages close packing shapes over the conventional design for burn efficiency. The efficiency of a burn, or BBQT/lb (TO380/lb of a product) is a function of the burn weight that is used. This chart demonstrates a few key points of the inspirational shapes that were initially tested. Specifically, all test shapes show a higher BBQT/lb versus the control shape at an equal weight, which means that at a constant weight, the products burn longer than the conventional product, or at a specific lower weight they can have a parity BBQT/lb to the conventional product. The modified shapes described herein demonstrate substantially more efficient burn characteristics. In some embodiments, the modified shapes can include one or more surface features that further improves the BBQT/lb. As an example, the small pillow has a smaller volume than the 75% control, so theoretically it should have a higher efficiency. However, the addition of surface features in the 75% control drives its BBQT/lb higher than that of the small pillow design.

Figure 8A:
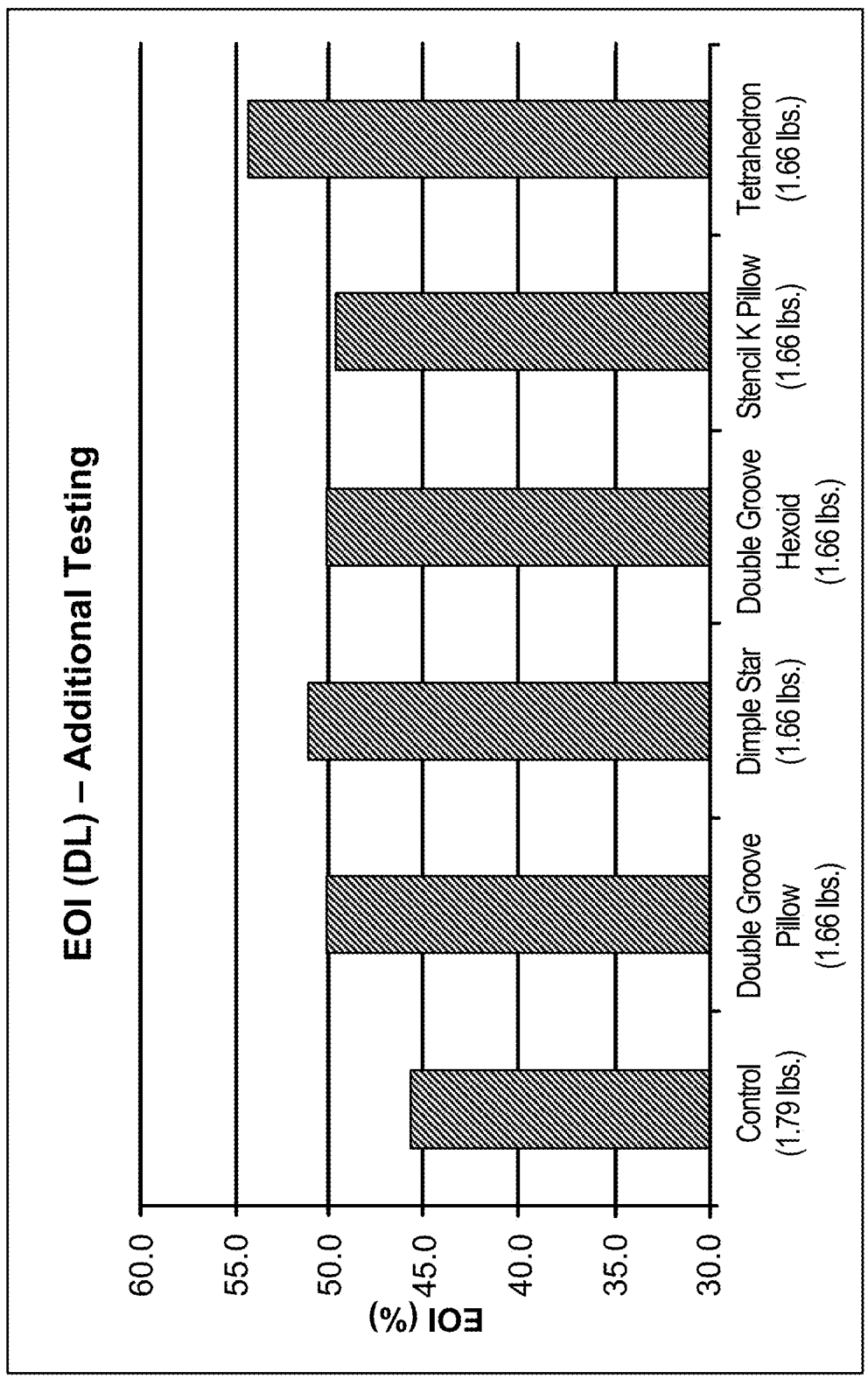
FIGS. 8A-8B shows burn characteristics per weight of select briquet designs of some embodiments as compared to conventional briquet designs.
Figure 8B:
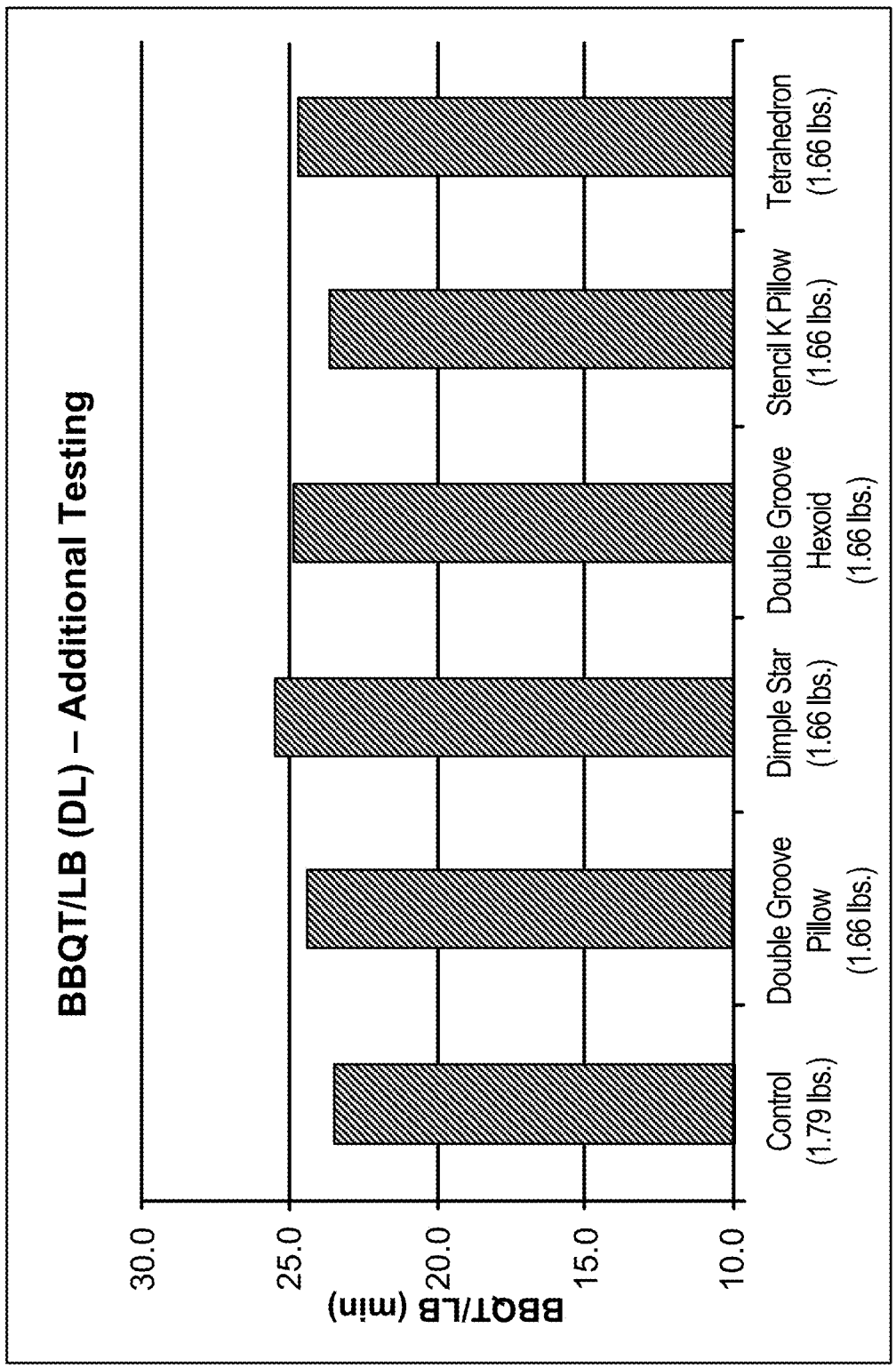
Figure 9A:
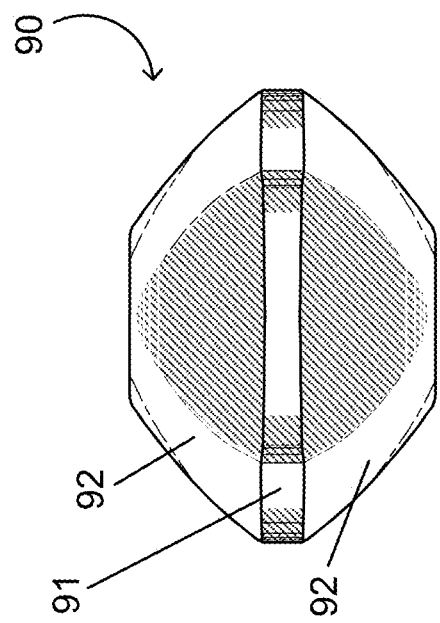
FIGS. 9A-9D illustrates another example briquet shapes having improved close packing properties in accordance with some embodiments.
Figure 9B:
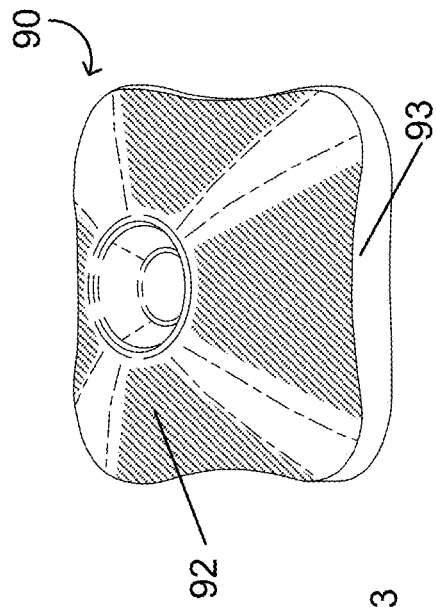
Figure 9C:
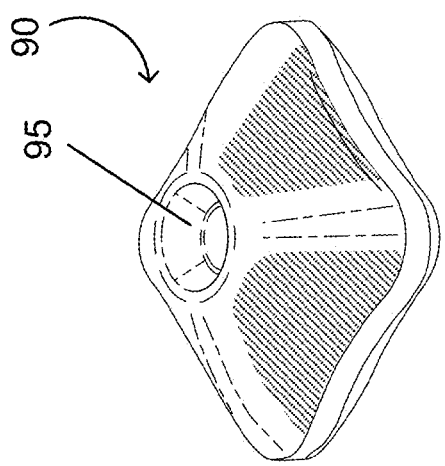
Figure 9D:
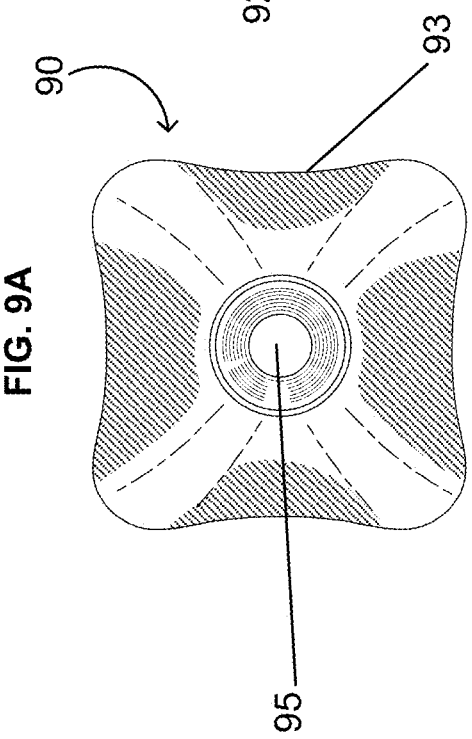
Figure 10A:
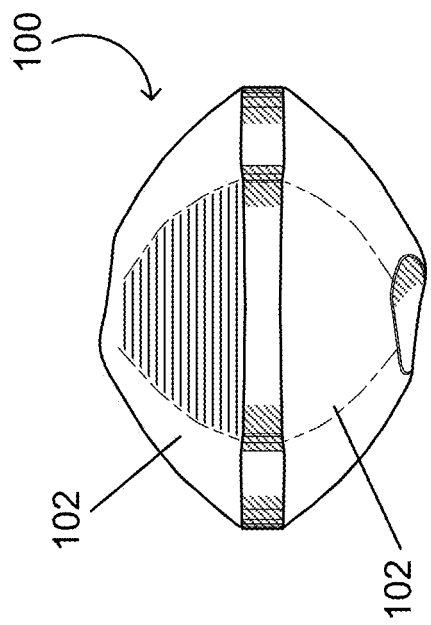
FIGS. 10A-10D illustrates another example briquet shape having improved close packing properties in accordance with some embodiments.
Figure 10B:
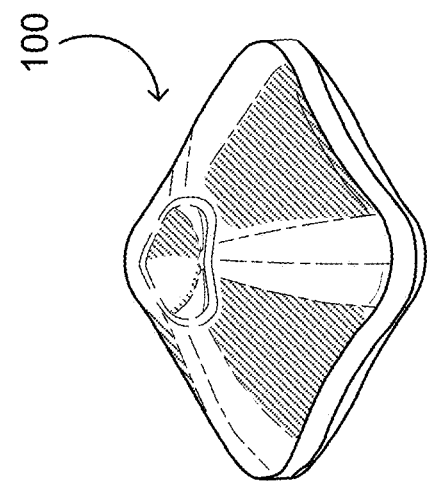
Figure 10C:
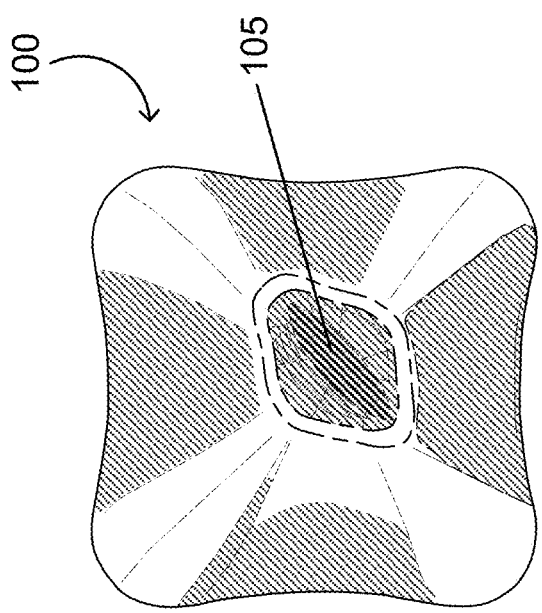
Figure 10D:
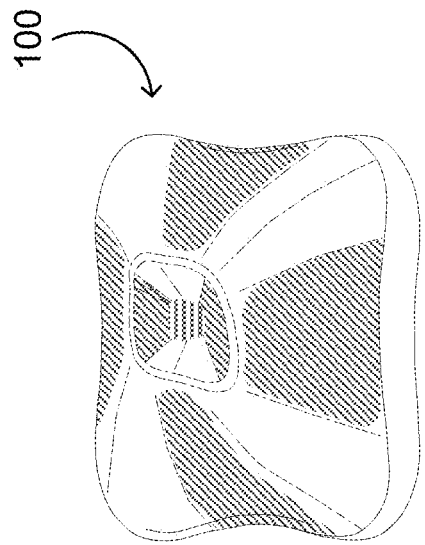
Figure 11A:
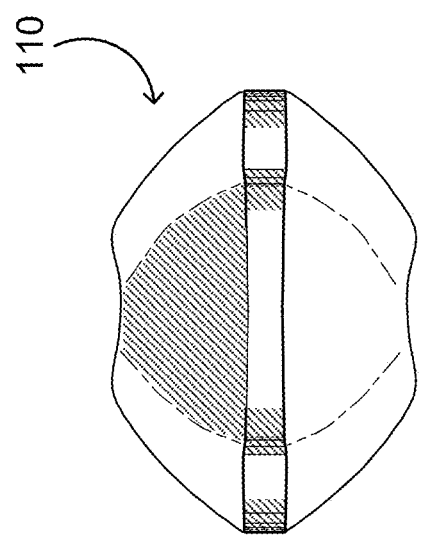
FIGS. 11A-11D illustrates another example briquet shape having improved close packing properties in accordance with some embodiments.
Figure 11B:
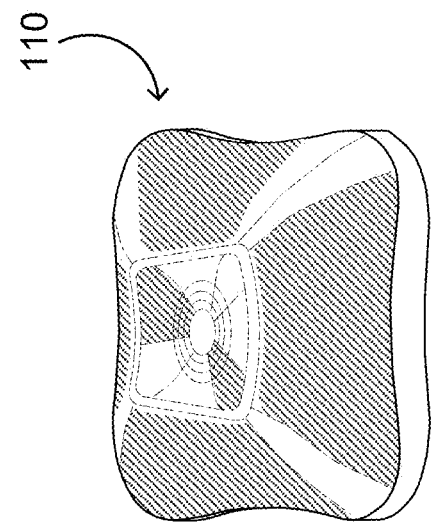
Figure 11C:
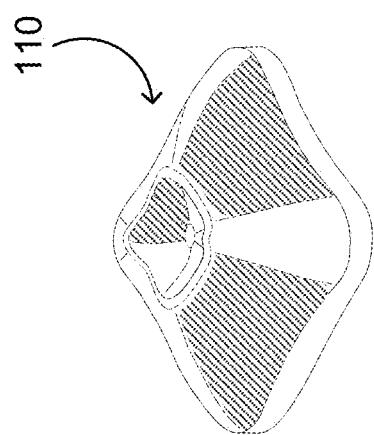
Figure 11D:
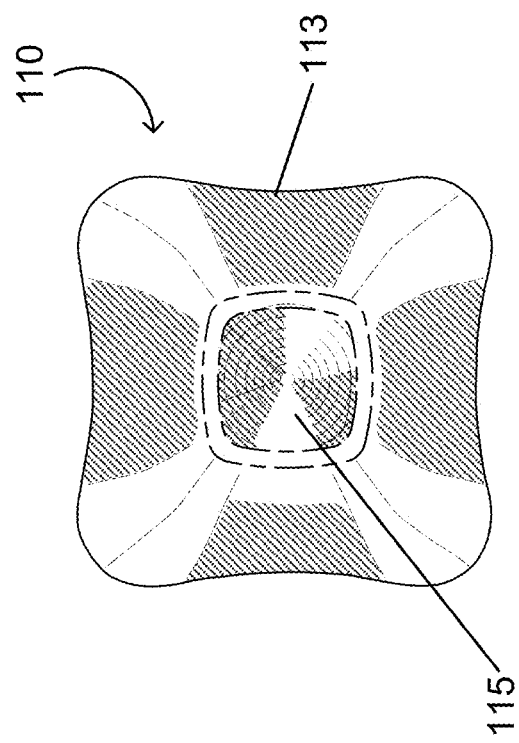
Figure 12B:
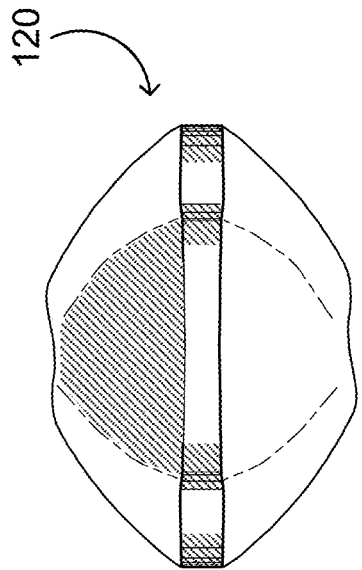
FIGS. 12A-12D illustrates another example briquet shape having improved close packing properties, in accordance with some embodiments.
Figure 12D:
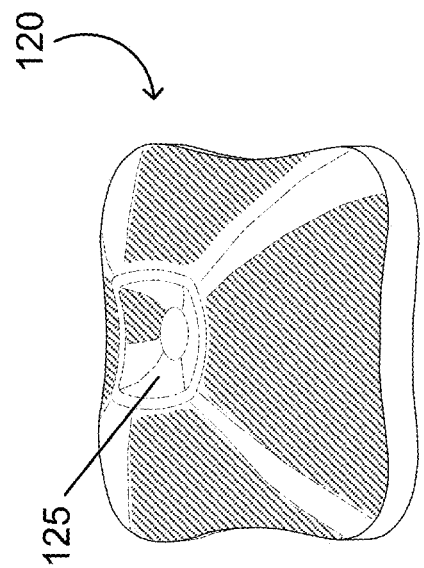
Figure 12A:
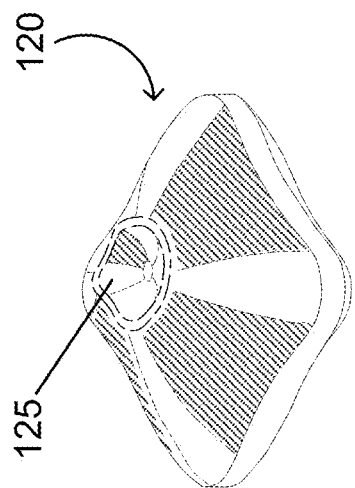
Figure 12C:
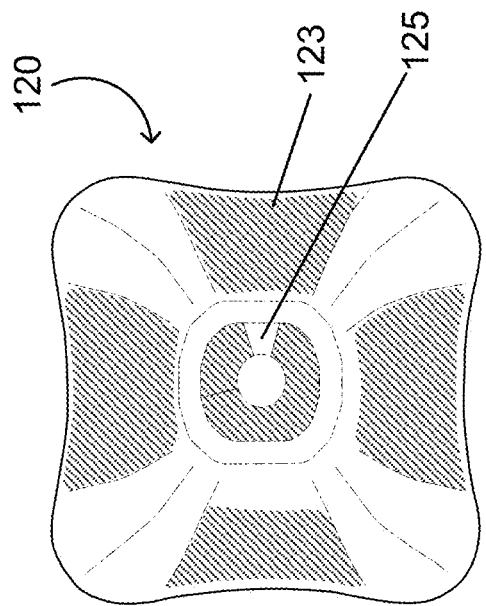
Figure 13B:
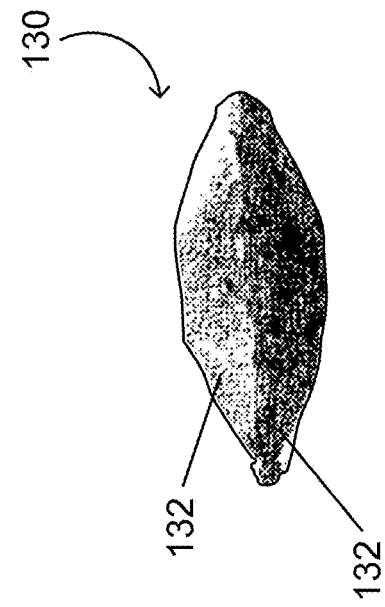
FIGS. 13A-13D illustrates another example briquet shape having improves close packing properties in accordance with some embodiments.
Figure 13A:
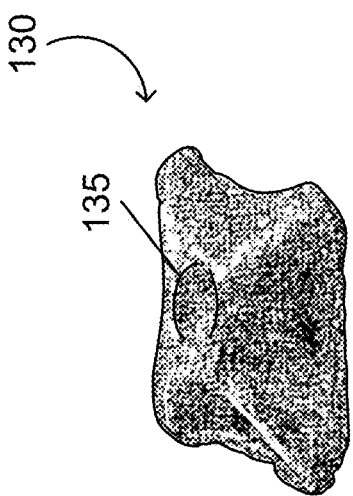
Figure 13D:
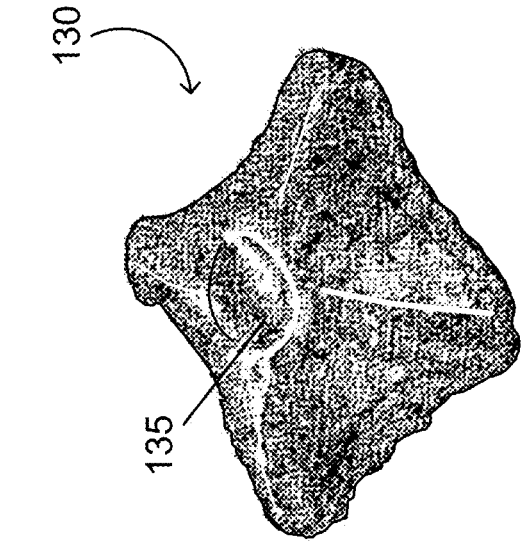
Figure 13C:
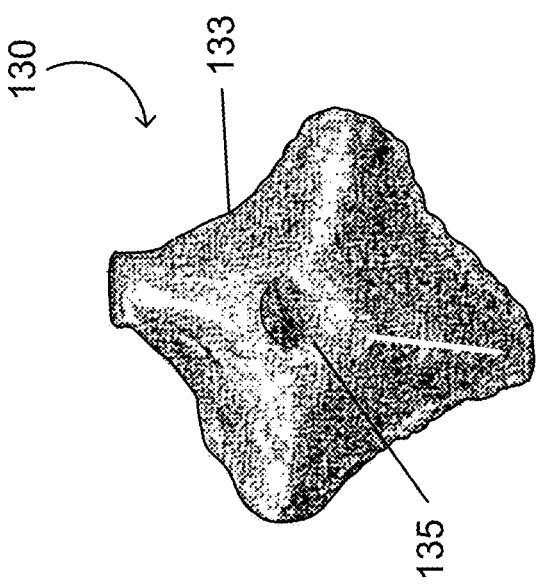

FIGS. 8A-8B depict graphs showing the burn performance of shapes from the additional testing. As seen in FIG. 8A, at a lower burn weight, all shapes from additional testing have an improved EOI (e.g. improved lighting) versus control. As seen in FIG. 8B, at a lower burn weight, all shapes have a parity to higher BBQT/lb (e.g. burn efficiency) versus control. It is noted that the test shapes were of a smaller volume than the control.

FIGS. 9A-18 depict alternative briquet shapes that provide random close packing and improved burn efficiency. FIGS. 9A-9D depicts example briquet 90, which has similar features as the embodiment in FIG. 1A, except the special surface feature 95 has sharper edges and sidewalls. FIGS. 10A-10D depict example briquet 100, which has similar features as the embodiment in FIG. 1A, except the special surface feature 15 is defined as an irregular, off-center depression and facilitate random arrangement within a close packed pile. FIGS. 11A-11D depicts example briquet 110, which has similar features as the embodiment in FIG. 1A, except the special surface feature 115 is defined as a square depression. Such a configuration may further reduce the volume of each individual briquet.

FIGS. 12A-12D depict example briquet 120, which has similar features as the embodiment in FIG. 1A, except the special surface feature 125 is defined as an irregular, off-center depression, which may and facilitate random stacking within a close packed pile.

FIGS. 13A-13D depict example briquet 130, which has similar features as the embodiment in FIG. 1A, except the pyramidal portions 132 are more shallow, having an aspect ratio greater than 1:1, typically about 2:1. Such a configuration further reduces the volume and material in each briquet, but retains some of the advantages of the pyramidal shape, the inwardly curved sides of the mid-plane portion and the special surface feature dimple. While various features are described herein, it is appreciated that any of the features described herein could be utilized in any combination or can be modified in accordance with the concepts and principles described herein.

Figure 14:
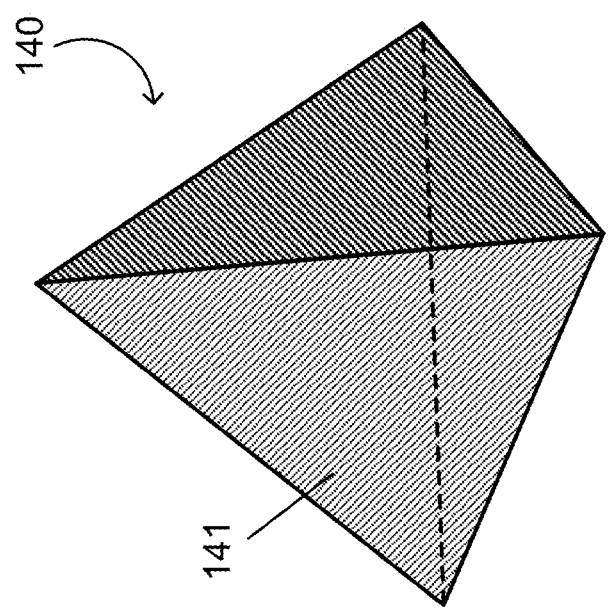

FIG. 14 depicts a tetrahedron briquet 140 having planar faces 141, which optimizes the close packing aspect of the shape, as described previously. While such shapes allow for closer packing than curved designs, particularly pillow-shaped briquets, such tetrahedron shapes are difficult to manufacture utilizing conventional methods, such as press-rolling. Therefore, to improve manufacturability, one or more portions can be rounded so as to aid in removal or discharge of the briquet from the press roll, for example as shown in the embodiment of FIG. 15.

Figure 15:
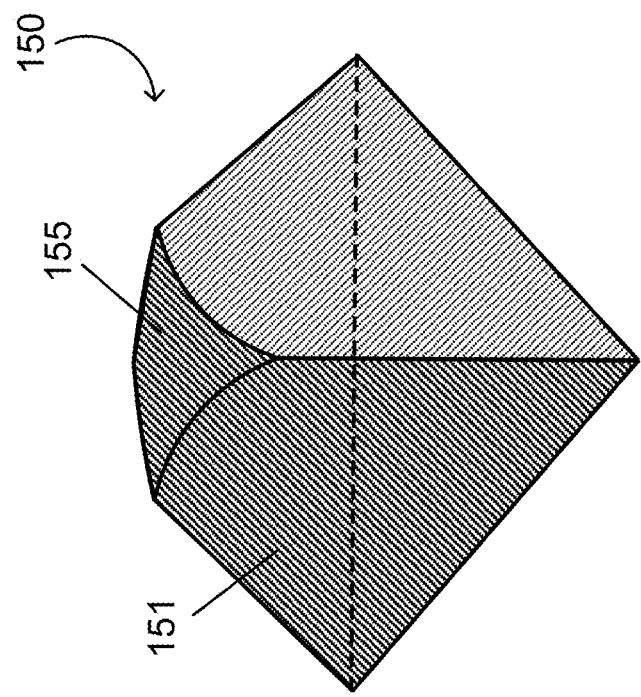
FIGS. 14-16 illustrate example briquet designs having tetrahedron shapes with close packing properties in accordance with some embodiments.

FIG. 15 shows a briquet formed in a rounded tetrahedron shape 150 that includes special surface feature 155 defined by a rounded portion of the apex while the shape retains substantially planar faces 151. The rounded portion 155 may aid in release of the briquet from the pocket of the press-roll in which the briquet is formed and improve manufacturability. It is further appreciated that various other portions, include edges between planar faces could be rounded or contoured as well.

Figure 16:
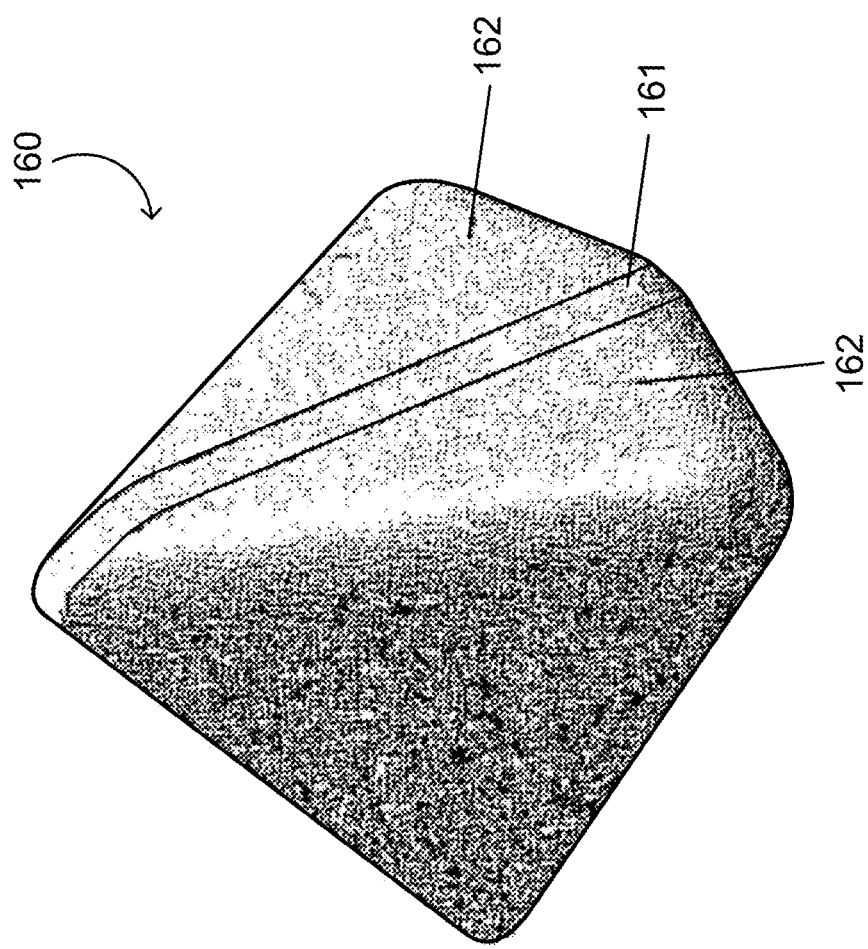
Figure 17B:
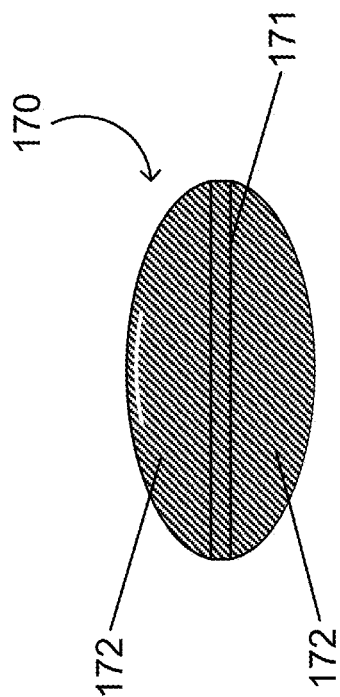
FIGS. 17A-17D illustrate an alternative briquet design of an oblate spheroid shape with close packing properties in accordance with some embodiments.
Figure 17D:
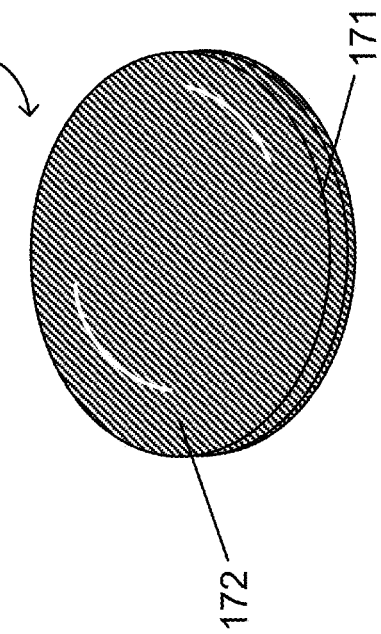
Figure 17A:
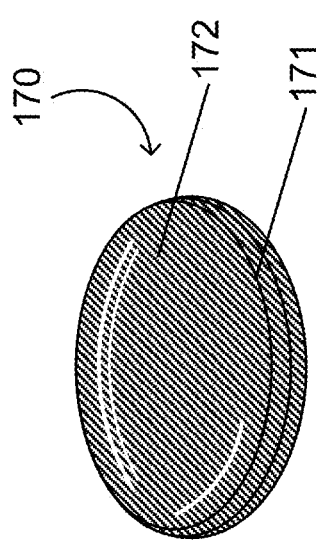
Figure 17C:
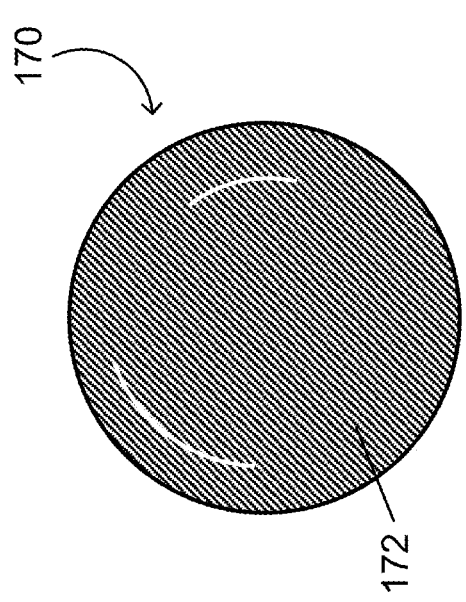
Figure 18A:
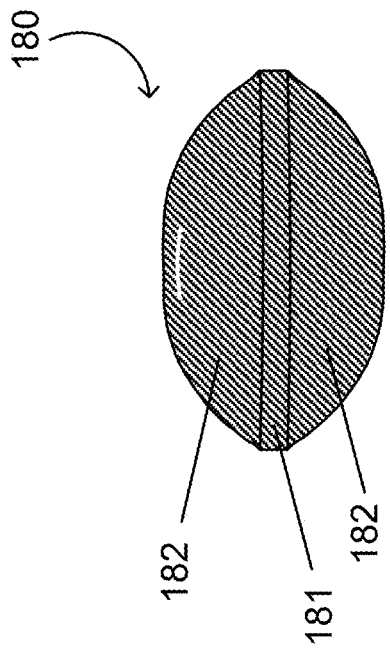
FIGS. 18A-18D illustrate an alternative briquet design of an oblate spheroid shape with close packing properties in accordance with some embodiments.
Figure 18B:
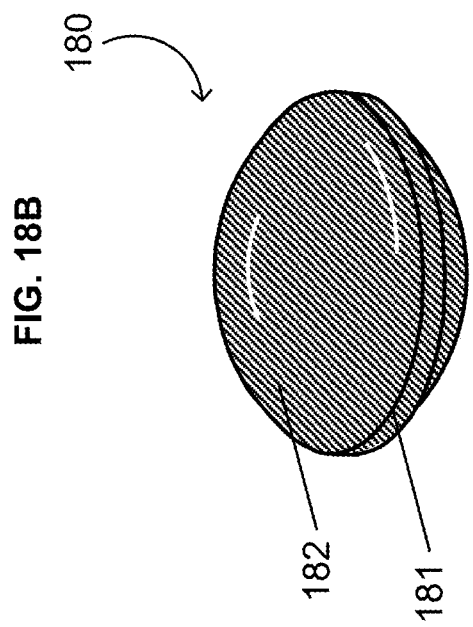
Figure 18C:
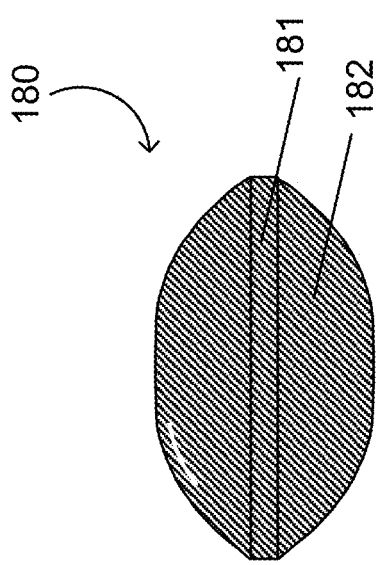
Figure 18D:
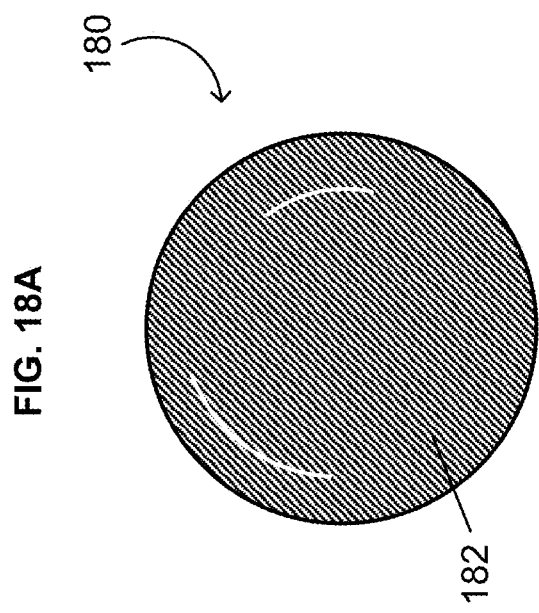
Figure 19A:
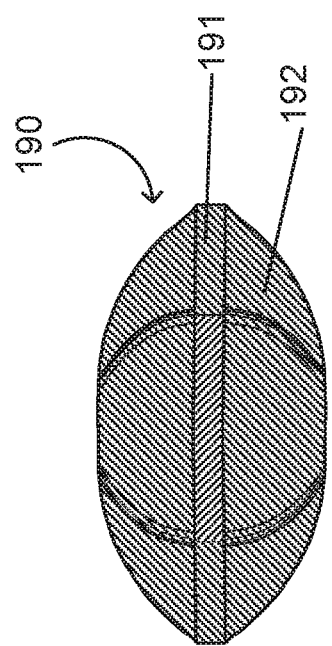
FIGS. 19A-19D illustrate an alternative briquet design of an oblate hexoid shape with close packing properties in accordance with some embodiments.
Figure 19B:
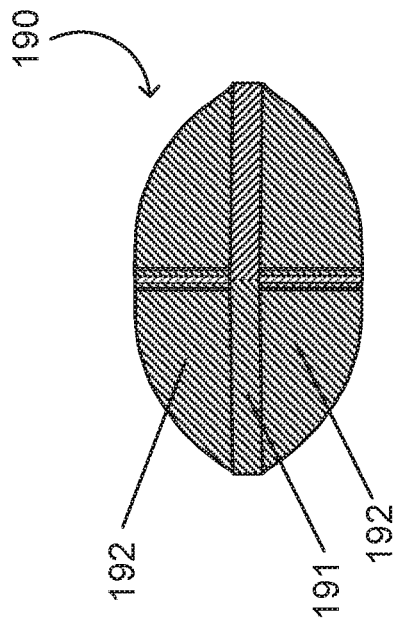
Figure 19C:
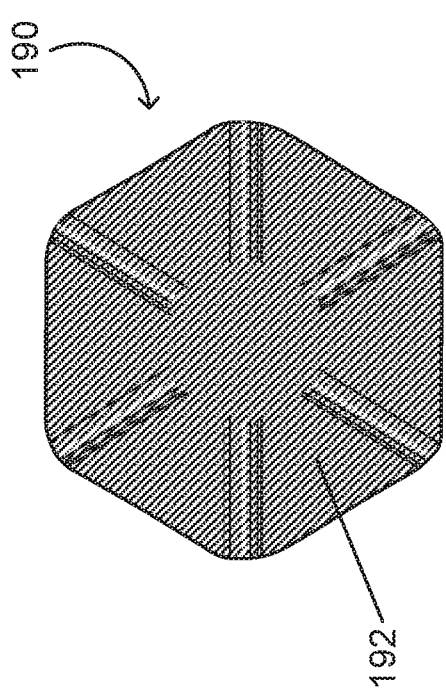
Figure 19D:
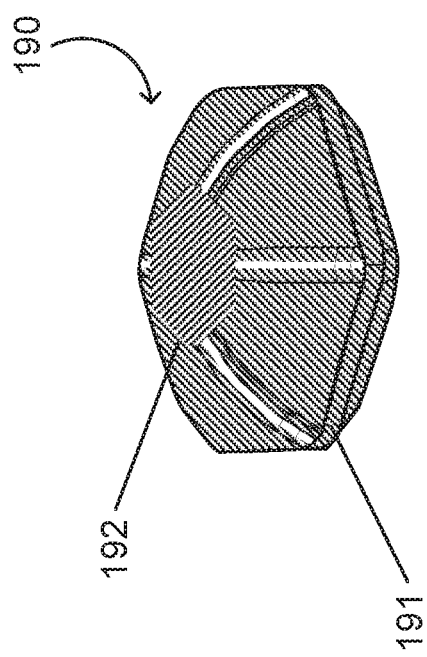

FIG. 16 depicts a modified tetrahedron 160 with a design that further improves manufacturability. In this design, similar to that of FIGS. 2A-2D, the mid-plane portion 161 extends between two tetrahedrons 162 so that, in combination, a substantial majority of the briquet forms a pyramidal shape (shown pointing upward in FIG. 16). While this modified tetrahedron shape substantially retains the close packing attributes of the tetrahedron, the orientation of the tetrahedrons in regard to the mid-plane portion aids in release of the briquet from the pocket of the press-roller since there is less material friction due to reduced depth in the pocket of the press rollers assembly. This feature also improves manufacturability by allowing more pockets/briquets to be included on the insert of the press-rollers.

FIGS. 17A-18D depict briquets having a generally oblate spheroidal shape. FIGS. 17A-17D depict an oblate spheroid 170 having a mid-plane portion 171 extending along a major axis of the oblate spheroid between convexly curved spheroid halves 172. Such shapes further improve manufacturability as the shape readily releases from the half spheroid pockets of the press-rollers. Spheroid briquet 170 can further include special surface features 176 in one or both sides, shown here as two indents or depressions in a top side, to further reduce the volume of each briquet. Such features facilitate a random close pack pile when randomly poured. It is understood that the oblate spheroid can be without any special surface features or can include various other surface features as well. FIGS. 18A-18D similarly depict a briquet having an oblate spheroid shape 180 in which the mid-plane portion 181 is circular and extends between spheroid halves 182. It is appreciated that either of these briquet design can further include one or more surface features comprising 35% or less of the a total surface area of the briquet, for example, a dimple, depression or other indentation.

FIGS. 19A-19D depict a briquet having an oblate hexoid shape. As shown, the oblate hexoid briquet 190 includes a mid-plane portion 191 defined as a hexagon, from which six faces 182 extend and curve to approximate or approach a spheroidal shape. It is appreciated that this briquet design can further include one or more surface features comprising 35% or less of the total surface area of the briquet, for example, a dimple, depression or other indentation.

While the exemplary embodiments have been described in some detail, by way of example and for clarity of understanding, those of skill in the art will recognize that a variety of modifications, adaptations, and changes may be employed. Hence, the scope of the present invention should be limited solely by the appending claims.

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A briquet comprising:
a solid combustible fuel formed in a shape,
wherein the shape is defined to allow for close-packing at a density of 450 to 3,000 briquets per cubic foot when a plurality of briquets of like shape are randomly arranged within a randomly poured pile,
wherein the shape comprises a pair of polygonal pyramidal portions extending from opposite sides of a polygonal mid-plane portion, wherein each polygonal pyramidal portion comprises a flattened or depressed portion only within an apex region thereof.

2. The briquet of claim 1, wherein the shape is defined so that a volume of each briquet is within a range between 0.2 to 2 cubic inches.

3. The briquet of claim 1, wherein the shape is defined so a total number of edges within the randomly poured pile is within a range from 5,000 to 15,000 inches per cubic foot.

4. The briquet of claim 1, wherein the shape comprises one or more surface features comprising 35% or less of the total surface area of the briquet, wherein the surface feature comprises a depression.

5. The briquet of claim 1, wherein the shape comprises one or more polygonal pyramidal portions.

6. The briquet of claim 5, wherein the one or more polygonal pyramidal portions comprise a pair of polygonal pyramidal portions extending from opposing sides of a polygonal mid-plane portion.

7. The briquet of claim 5, wherein the polygonal mid-plane portion is a regular polygon with three or more sides.

8. The briquet of claim 5, wherein the one or more polygonal pyramidal portions comprise a rectangular or triangular pyramid.

9. A close packing briquet comprising:
a solid combustible fuel formed in a shape,
wherein the shape comprises a pair of polygonal pyramidal portions extending from opposite sides of a polygonal mid-plane portion, wherein the polygonal mid-plane portion comprises a square with rounded corners and each side having an inwardly-curved concave portion,
wherein the briquet is shaped and dimensioned to facilitate close packing when a plurality of briquets of like shape are randomly arranged within a randomly poured pile.

10. The briquet of claim 9, wherein the shape comprises a volume within a range from 0.20 to 2.0 cubic inches.

11. The briquet of claim 10, wherein close packing comprises a density of 450 to 3,000 briquets per cubic foot.

12. The briquet of claim 9, wherein each of the one or more pyramidal portions comprise a plurality of sloped faces extending toward an apex, wherein a sloping of the plurality of sloped faces comprises an aspect ratio of about 1:1.

13. The briquet of claim 9, wherein the inwardly curved concave portion of each side extends partly along the top and bottom faces extending from the mid-plane sides.

14. The briquet of claim 9, wherein each of the one or more polygonal pyramidal portions comprises a plurality of faces, wherein the faces are curved.

15. The briquet of claim 9, wherein the one or more polygonal pyramidal portions comprises a first polygonal pyramidal portion defining a top surface of the briquet and a second polygonal pyramidal portion defining a bottom surface, wherein any edges or transitions between faces are curved such that each of the top and bottom surface is a substantially continuous surface.

16. The briquet of claim 9, wherein each of the polygonal pyramidal portions comprises a flattened or depressed portion only within an apex region.

17. The briquet of claim 16, wherein the flattened or depressed portion is defined along an upper third or less of the respective pyramidal portion.

18. The briquet of claim 16, wherein the depressed portion comprises a circular dimple.

19. The briquet of claim 16, wherein the depressed portion comprises an irregular shape or marking.

20. The briquet of claim 9, wherein the one or more polygonal pyramidal portions comprise two opposing irregular triangular pyramids.

21. The briquet of claim 20, wherein the two opposing irregular triangular pyramids are defined so as to define, in combination, a larger pyramidal portion comprising a majority of the briquet.

\* \* \* \* \*